(12) United States Patent
Merrill et al.

(10) Patent No.: US 6,369,821 B2
(45) Date of Patent: *Apr. 9, 2002

(54) METHOD AND SYSTEM FOR SYNCHRONIZING SCRIPTED ANIMATIONS

(75) Inventors: John Wickens Lamb Merrill, Redmond; Tandy W. Trower, II, Woodinville; Mark Jeffrey Weinberg, Carnation, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,144

(22) Filed: Feb. 26, 1998

Related U.S. Application Data

(63) Continuation-in-part of application No. 08/858,648, filed on May 19, 1997, now Pat. No. 5,983,190.

(51) Int. Cl.[7] .......................... G06T 13/00; G06T 15/70
(52) U.S. Cl. ........................................ 345/473; 345/949
(58) Field of Search ................................. 345/949, 951, 345/952, 956, 957, 950, 473–475

(56) References Cited

U.S. PATENT DOCUMENTS 4,884,972 A 12/1989 Gasper 5,111,409 A 5/1992 Gasper et al.

(List continued on next page.)

OTHER PUBLICATIONS

*Microsoft 3D Movie Maker* (*User Manual*), Document No. CD–65205–0995, Microsoft Corporation, 1995.

*Microsoft 3D Movie Maker* (*CD–ROM*), Microsoft Corporation, 1995.

(List continued on next page.)

*Primary Examiner*—William A. Cuchlinski, Jr.
*Assistant Examiner*—Thu Nguyen
(74) *Attorney, Agent, or Firm*—Klarquist Sparkman, LLP

(57) ABSTRACT

An animation system provides synchronization services to synchronize actions of two more interactive user interface characters that are displayed simultaneously. The animation services allow applications to make animation requests to control the actions of characters on the display. These actions include playing one of the character's animation sequences and generating speech output with lip-synched animation of the character's mouth. Accessible via script commands or an Application Programming Interface, the synchronization services allow an application to control interaction between two or more characters on the display. Applications can synchronize actions by invoking straight-forward commands such as Wait, Interrupt, or Stop. In response to these commands, the animation server synchronizes scheduled actions by halting playback of a character until a specified action of another character completes or halting a specified action of one character after scheduled actions for another character are completed.

38 Claims, 9 Drawing Sheets

U.S. PATENT DOCUMENTS

| | | | |
|---|---|---|---|
| 5,278,943 | A | 1/1994 | Gasper et al. |
| 5,287,446 | A | 2/1994 | Williams et al. |
| 5,377,997 | A | 1/1995 | Wilden et al. |
| 5,425,139 | A | 6/1995 | Williams et al. |
| 5,430,835 | A | 7/1995 | Williams et al. |
| 5,465,362 | A * | 11/1995 | Orton et al. ............... 345/340 |
| 5,613,056 | A | 3/1997 | Gasper et al. |
| 5,630,017 | A | 5/1997 | Gasper et al. |
| 5,867,175 | A * | 2/1999 | Katzenberger et al. ..... 345/473 |

OTHER PUBLICATIONS

Screen Shot "Synchronize" of Microsoft 3D Movie Maker Software, Microsoft Corporation, p. 1, 1995.

Screen Shot "To change path timing" of Microsoft 3D Movie Maker Software, Microsoft Corporation, p. 1, 1995.

Screen Shot "Go to the place" of the Microsoft 3D Movie Maker Software, Microsoft Corporation, p. 1, 1995.

Screen Shot "Wait for sound to end" of Microsoft 3D Movie Maker Software, Microsoft Corporation, p. 1, 1995.

Screen Shots "Table of Contents" "Basics" "How To . . . " "Tools" and "Tips" of Microsoft 3D Movie Maker Software, Microsoft Corporation, 52 pages, 1995.

Freeman, "Microsoft 3D Movie Maker," http://www.c-cwmag.com/articles/96–6/3maker.htm, pp. 1–2, Jun. 1996.

"Microsoft Gives Kids Tools and Technology to Unleash Their Imagination and Experience New Adventures," http://www.microsoft.com/PressPass/press/1996/Oct96/KID-SPR.asp, pp. 1–5, Oct. 9, 1996.

Ken Getz, "Office 97 Shared Programmable Objects," 1997, MSDN Library, Apr. 1998 Version.

Microsoft Corp., "Microsoft Visual Basic for Applications, Version 5.0 Solutions Enhancements Guide," Oct. 1996, MSDN Library, Apr. 1998 Version.

Toggle Entertainment, Inc., "HTTP://togglethis.com," 1997, 1998, World Wide Web.

Syrdal, A. et al., *Applied Speech Technology*, Speech: Articulatory, Linguistic, Acoustic, and Perceptual Descriptions, Chapter 1, Section 5, pp. 15–22 (1995), Wellesley, Massachusetts.

Parke & Waters, *Computer Facial Animation*, Speech Synchronized Animation, Chapter 8, pp. 259–285 (1996), Boca Raton, Florida.

\* cited by examiner

METHOD AND SYSTEM FOR SYNCHRONIZING SCRIPTED ANIMATIONS

RELATED APPLICATION DATA

This application is a continuation in part of U.S. application Ser. No. 08/858,648 filed with the U.S. Patent and Trademark Office on May 19, 1997 and issued as U.S. Pat. No. 5,983,190 on Nov. 9, 1999.

FIELD OF THE INVENTION

The invention relates to computer generated animation, and more specifically to synchronization of interactive animations (animations that are responsive to user input).

BACKGROUND OF THE INVENTION

Computer animation is more compelling when it includes realistic interaction among the components in a graphics scene. This is especially true when the animated characters in a graphics scene are supposed to simulate life-like interaction. Consider the following scenario: during a short segment of an animated display, two characters are on-screen doing a vaudeville routine. They dance together for a while, then one of them stops, puts down his cane, and turns to the other, who is still dancing. He says, "Hey, Merlin! Did you hear the one about the cat who ate the paper?" Merlin responds, "No, I haven't heard that one."

Scenarios like this are at the heart of animation, yet it is difficult for application programs to synchronize the actions of characters so that they appear more life-like. Most current applications use a time-based scripting system, in which the precise times at which individual actions and gestures evolve in lock step with a clock. This method is very flexible and quite powerful. Unfortunately, it requires a great deal of attention to each frame, it is very time-consuming, and the resulting script is hard to read. These limitations affect the use and availability of animation to designers in the mass market. Since it is particularly difficult to express such scripts in string format, they are particularly unsuitable to the World Wide Web (the Web), over which most control information is transmitted as text.

So-called rapid prototyping languages (including the Microsoft Visual Basic (VB) and Borland Delphi prototyping languages) use a much more accessible form of scripting. These languages use textual command scripts to run procedures based on underlying controls. VB, in particular, represents its scripts as simple text files, which can be edited with the most basic of tools and are easy to read and write. Moreover, VBScript, a somewhat restricted form of VB, is already widely available as a scripting tool over the Web, and is naturally expressed in text.

While these rapid prototyping languages facilitate development of software applications and are well suited for Web site development, they do not provide the precise control over timing that multimedia scripts provide. Unfortunately, multimedia scripts are more difficult to use, particularly because they require complex time-based programming to synchronize animations.

SUMMARY OF THE INVENTION

The invention provides a method for synchronizing animations that addresses these and other drawbacks. The invention may be implemented in an animation server that provides synchronization services to client programs. The synchronization services are particularly well suited for scripted animations, i.e., animations that are controlled via a script. However, these synchronization services are also accessible to other types of application programs written in programming languages such as C, C++, and Java via an Application Programming Interface. The invention provides synchronization methods used to synchronize the playback and speech of two or more interactive animations that share the display. These animations are interactive in the sense that they respond to user input such as clicks of a mouse button or speech input via a speech recognition engine.

In one implementation of the invention, an animation system enables applications to request animation services and input/output services for interactive animations such as user interface characters. One specific form of this type of character is a non-rectangular animation that is superimposed over the windows of concurrently executing programs. Through the animation system's input services, applications can specify the input commands that a character will be responsive to, including mouse input or speech via a speech recognition engine Applications animate the characters by invoking commands to request actions such as playing an animation sequence or generating speech output from text. In response to these commands, the system schedules the actions for playback. In one implementation, the system maintains a queue for each character and schedules the actions in first-in, first-out order.

To synchronize actions of two or more characters, an application invokes a synchronization command of the animation system and specifies an action of a character that it wants to synchronize with another character. The way in which the system synchronizes the actions of the characters depends on the synchronization command. One type of command, called a wait command, synchronizes actions of different characters by halting a character until the specified action of another character has completed. Another type of command, called an interrupt, causes an interrupt to be scheduled for a character. When this interrupt is processed, the animation server halts (e.g., deletes from a queue) a specified action of another character. Using the events supported in the animation system, an application can program the system to notify it about the progress of an animation or about input from the user. This feature enables applications to synchronize actions of characters in response to events.

Applications can be written in the form of text-based scripts. These scripts control animations by making animation requests via textual script commands. Scripts can animate more than one character and synchronize the character's actions via the synchronization commands summarized above. The script commands operate on character actions, rather than on a time-based scheme. This enables programmers to quickly write animation scripts involving interaction between two or more animations without requiring precise frame by frame control of the animations.

Further features and advantages of the invention will become apparent with reference to the following detailed description and accompanying drawings.

DETAILED DESCRIPTION

Computer Overview

Figure 1:
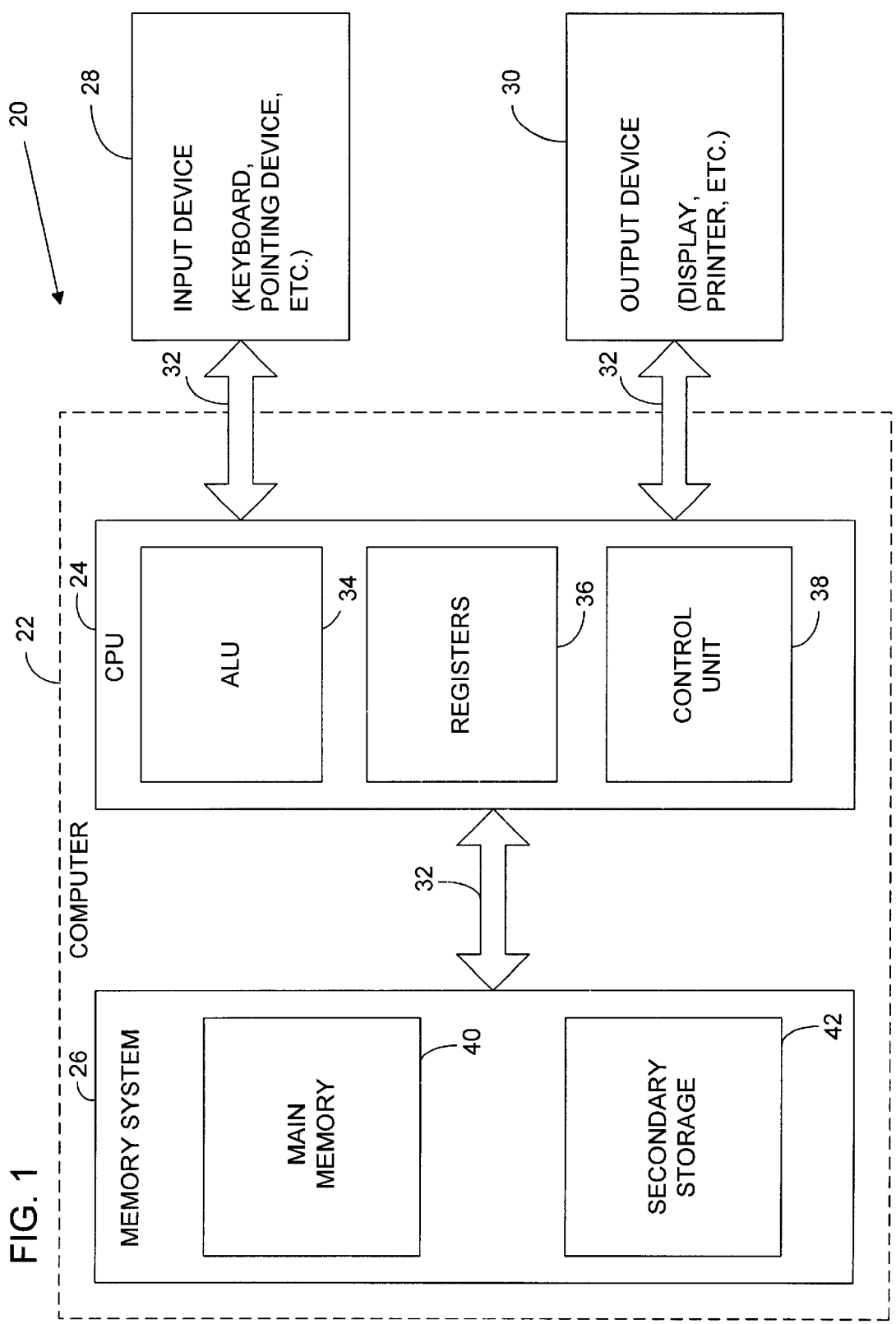
FIG. 1 is a general block diagram of a computer that serves as an operating environment for the invention.

FIG. 1 is a general block diagram of a computer system that serves as an operating environment for the invention. The computer system 20 includes as its basic elements a computer 22, one or more input devices 28, including a cursor control device, and one or more output devices 30, including a display monitor. The computer 22 has at least one high speed processing unit (CPU) 24 and a memory system 26. The input and output device, memory system and CPU are interconnected and communicate through at least one bus structure 32.

The CPU 24 has a conventional design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. The memory 26 can comprise a variety of alternative components having a variety of storage capacities.

The input and output devices 28, 30 are conventional peripheral devices coupled to or installed within the computer. The input device 28 can comprise a keyboard, a cursor control device such as a mouse or trackball, a physical transducer (e.g., a microphone), etc. The output device 30 shown in FIG. 1 generally represents a variety of conventional output devices typically provided with a computer system such as a display monitor, a printer, a transducer (e.g., a speaker), etc. Since the invention relates to computer generated animation and speech input and output services, the computer must have some form of display monitor for displaying this animation, a microphone and analog to digital converter circuitry for converting sound to digitized audio, and speakers and digital to audio converter circuitry for converting digitized audio output to analog sound waves.

For some devices, the input and output devices actually reside within a single peripheral. Examples of these devices include a network adapter card and a modem, which operate as input and output devices.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 34, registers 36 and control unit 38 or may be a single device in which one or more of these parts of the CPU are integrated together, such as in a microprocessor. Moreover, the number and arrangement of the elements of the computer system may be varied from what is shown and described in ways known in the computer industry.

Animation System Overview

Figure 2:
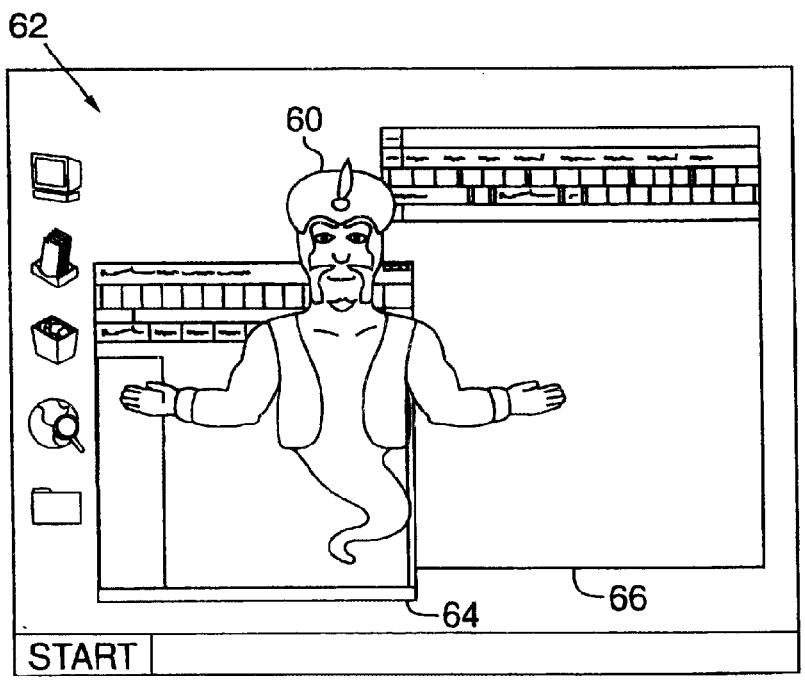
FIG. 2 is a screen shot illustrating an example of animated character located on top of the user interface in a windowing environment.

FIG. 2 is a screen shot illustrating an example of animated character located on top of the user interface in a windowing environment. This screen shot illustrates one example of how an implementation of the invention creates arbitrary shaped animation that is not confined to the window of a hosting application. The animated character 60 can move anywhere in the user interface. In this windowing environment, the user interface, referred to as the "desktop" includes the shell 62 of the operating system as well as a couple of windows 64, 66 associated with currently running application programs. Specifically, this example includes an Internet browser application running in one window 64 and a word processor application 66 running in a second window on the desktop of the Windows 95 Operating System.

The animated character moves on top of the desktop and each of the windows of the executing applications. As the character moves about the screen, the animation system computes the bounding region of the non-transparent portion of the animation and generates a new window with a shape to match this bounding region. This gives the appearance that the character is independent from the user interface and each of the other windows.

To generate an animation like this, the animation system performs the following steps:

1) loads the bitmap(s) for the current frame of animation;
2) constructs a frame of animation from these bitmaps (optional depending on whether the frame is already constructed at authoring time).
3) computes the bounding region of the constructed frame in real time;
4) sets a window region to the bounding region of the frame; and
5) draws the frame into the region window.

The bounding region defines the non-transparent portions of a frame of animation. A frame in an animation is represented as a rectangular area that encloses an arbitrary shaped animation. The pixels located within this rectangular area but do not form part of the arbitrary-shaped animation are transparent in the sense that they will not occlude or alter the color of the corresponding pixels in the background bitmap (such as the desktop in the Windows Operating System) when combined with it. The pixels located in the arbitrary animation are non-transparent and are drawn to the display screen so that the animation is visible in the foreground.

The bounding region defines the area occupied by non-transparent pixels within the frame, whether they are a contiguous group of pixels or disjoint groups of contiguous pixels. For example, if the animation were in the shape of a red doughnut with a transparent center, the bounding region would define the red pixels of the doughnut as groups of contiguous pixels that comprise the doughnut, excluding the transparent center. If the animation comprised a football and goalposts, the bounding region would define the football as one or more groups of contiguous pixels and the goalposts as one or more groups of contiguous pixels. The bounding region is capable of defining non-rectangular shaped animation including one or more transparent holes and including more than one disjoint group of pixels.

Once computed, the bounding region can be used to set a region window, a non-rectangular window capable of clipping input and output to the non-transparent pixels defined by the bounding region. Region windows can be implemented as a module of the operating system or as a module outside of the operating system. Preferably, the software module implementing region windows should have access to input events from the keyboard and cursor positioning device and to the other programs using the display screen so that it can clip input and output to the bounding region for each frame. The Windows Operating System supports the clipping of input and output to region windows as explained further below.

The method outlined above for drawing non-rectangular animation can be implemented in a variety of different types of computer systems. Below we describe an implementation of the invention in a client-server animation system. However the basic principles of the invention can be applied to different software architectures as well.

Figure 3:
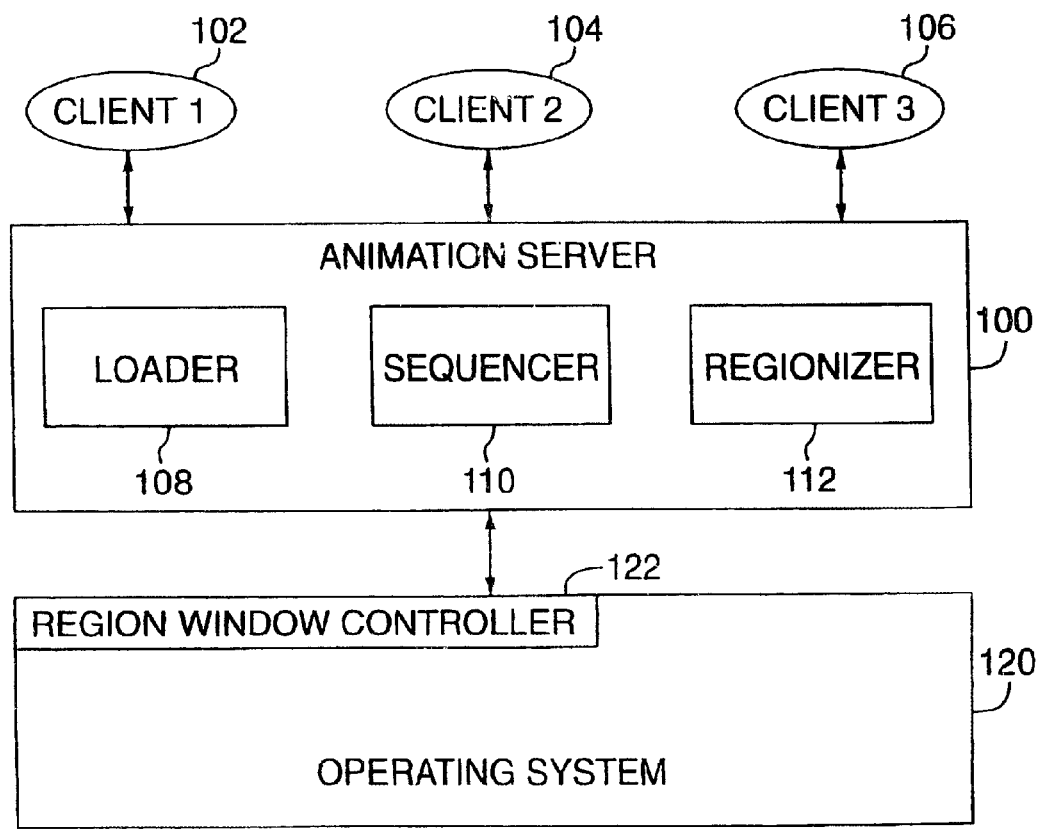
FIG. 3 is a diagram illustrating the architecture of an animation system in one implementation of the invention.

FIG. 3 is a general block diagram illustrating the architecture of a client server animation system. The animation system includes an animation server 100, which controls the playback of animation, and one or more clients 102–106, which request animation services from the server. During playback of the animation, the server relies on graphic support software in the underlying operating system 120 to create windows, post messages for windows, and paint windows.

In this specific implementation, the operating system creates and clips input to non-rectangular windows ("region windows"). To show this in FIG. 3, part of the operating system is labeled, "region window controller" (see item 122). This is the part of the operating system that manages region windows. The region window controller 122 creates a region window having a boundary matching the boundary of the current frame of animation. When the system wants to update the shape of a region window, the regionizer specifies the bounding region of the current frame to the operating system. The operating system monitors input and notifies the server of input events relating to the animation.

The services related to the playback of animation are implemented in four modules 1) the sequencer 110; 2) the loader 108 3) the regionizer 112; and 4) the mouth animation module (not shown). The sequencer module 110 is responsible for determining which bitmap to display at any given time along with its position relative to some fixed point on the display.

The loader module 108 is responsible for reading the frame's bitmap from some input source (either a computer disk file or a computer network via a modem or network adapter) into memory. In cases where the bitmap is compressed, the loader module is also responsible for decompressing the bitmap into its native format. There are variety of known still image compression formats, and the decompression method, therefore, depends on the format of the compressed bitmap.

The regionizer module 112 is responsible for generating the bounding region of the frame, setting it as the clipping region of the frame's hosting region window and then drawing the frame into the region. In slower computers, it is not feasible to generate the bounding region as frames are constructed and played back. Therefore, in this implementation the regionizer also supports the loading of bounding region information in cases where it is precomputed and stored along with the frame data in the animation file.

The mouth animation module is responsible for coordinating output with the animation representing a user interface character's mouth. The mouth animation module receives a message from a speech synthesis engine whenever a specific phoneme is about to be spoken. When the mouth animation module receives this message, it performs a mapping of the specified phoneme to image data stored in a animation mouth data file that corresponds to the phoneme. It is responsible for loading, decompressing, and controlling the playback of the animation representing the character's mouth.

The speech synthesis engine is responsible for generating speech output from text. In this implementation, the speech synthesis is a SAPI compliant text to speech generator from Centigram Communications Corp., San Jose, Calif. Other SAPI compliant text to speech generators can be used as well. For example, Lernout and Hauspie of Belgium also makes a SAPI compliant text to speech generator.

The speech recognition engine is responsible for analyzing digitized audio input to identify significant words or phrases selected by the animation server. The animation server defines these words or phrases by defining a grammar of acceptable phrases. The client specifies this grammar by specifying sequences of words that it wants the system to detect in a text string format. The server also supports a command language that includes boolean operators and allows alternative words. This command language enables the client to specify a word or phrase along with a number of possible alternative or option words to look for in the speech input. The syntax of the command language is described in more detail below.

The speech recognition used in this implementation is a SAPI compliant speech recognition engine made by Microsoft Corporation. A suitable alternative speech recognition engine is available from Lernout and Hauspie of Belgium.

The operating system in this implementation is the Windows 95 operating system from Microsoft Corporation. The application programming interface for the operating system includes two functions used to create and control region windows. These functions are:
1) SetWindowRgn; and
2) GetWindowRgn
SetWindowRgn The SetWindowRgn function sets the window region of a rectangular host window. The window region is an arbitrary shaped region on the display screen defined by an array of rectangles. These rectangles describe the rectangular regions of pixels in the host window that the window region covers.

The window region determines the area within the host window where the operating system permits drawing. The operating system does not display any portion of a window that lies outside of the window region. A description of an implementation of SetWindowRgn follows below:

int SetWindowRgn(

HWND hWnd,//handle to window whose window region is to be set

HPRGN hRgn, //handle to region

BOOL bRedraw //window redraw flag

);

Parameters hWnd

Handle to the window whose window region is to be set.

hRgn

Handle to a region. The function sets the window region of the window to this region. If hRgn is NULL, the function sets the window region to NULL.

bRedraw

Boolean value that specifies whether the operating system redraws the window after setting the window region. If bRedraw is TRUE, the operating system does so; otherwise, it does not. Typically, the program using region windows will set bRedraw to TRUE if the window is visible.

Return Values

If the function succeeds, the return value is nonzero.

If the function fails, the return value is zero.

Remarks

If the bRedraw parameter is TRUE, the system sends the WM_WINDOWPOSCHANGING and WM_WINDQWPOSCHANGED messages to the window.

The coordinates of a window's window region are relative to the upper-left corner of the window, not the client area of the window. After a successful call to SetWindowRgn, the operating system owns the region specified by the region handle hRgn. The operating system does not make a copy of the region. Thus, the program using region windows should not make any further function calls with this region handle. In particular, it should not close this region handle. A description of an implementation of SetWindowRgn follows below:

GetWindowRgn

The GetWindowRgn function obtains a copy of the window region of a window. The window region of a window is set by calling the SetWindowRgn function.

int GetWindowRgn(

HWND hWnd,//handle to window whose window region is to be obtained

HRGN hRgn //handle to region that receives a copy of the window region

);

Parameters hWnd

Handle to the window whose window region is to be obtained.

hrgn

Handle to a region. This region receives a copy of the window region.

Return Values

The return value specifies the type of the region that the function obtains. It can be one of the following values:

| Value | Meaning |
| --- | --- |
| NULLREGION | The region is empty. |
| SIMPLEREGION | The region is a single rectangle. |
| COMPLEXREGION | The region is more than one rectangle. |
| ERROR | An error occurred; the region is unaffected. |

Comments

The coordinates of a window's window region are relative to the upper-left corner of the window, not the client area of the window.

The region window controller shown in FIG. 3 corresponds to the software in the operating system that supports the creation of region windows and the handling of messages that correspond to region windows.

In this implementation, the speech recognition engine and the speech synthesis engine communicate with an audio input and output device such as a sound card according to the SAPI specification from Microsoft. In compliance with SAPI, these engines interact with an audio device through software representations of the audio device referred to as multimedia audio objects, audio sources (which provide input to the speech recognition engine) and audio destinations (which mediate output from the speech synthesis engine). The structure and operation of this software representation are described in detail in the SAPI specification available from Microsoft.

In the next two sections, we describe two alternative implementations of the animation system shown in FIG. 3. Both implementations generate arbitrary shaped animation and can compute the arbitrary shaped region occupied by non-transparent pixels of a frame in real time. However, the manner in which each system computes and stores this region data varies. Specifically, since it is not computationally efficient to re-compute the region data for every frame, these systems use varying methods for caching region data. The advantages of each approach are summarized following the description of the second implementation.

First Implementation of the Animation System

Figure 4:
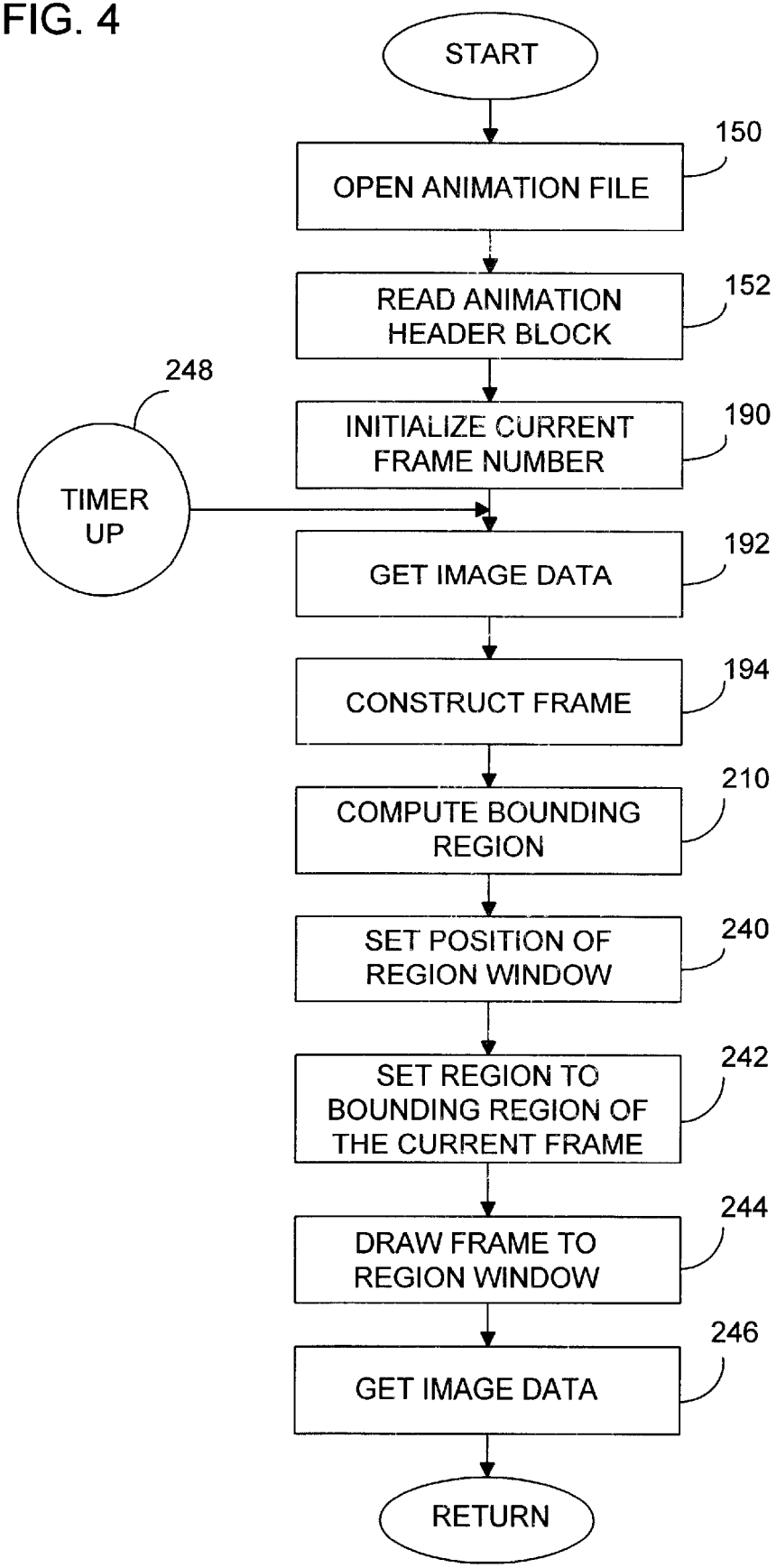
FIG. 4 is flow diagram illustrating how the animation server in FIG. 3 plays an animation.

FIG. 4 is flow diagram illustrating how the animation server plays an animation. First, the animation data file is opened via the computer's operating system as shown in step 150. The animation data file includes an animation header block and a series of bitmaps that make up each of the frames in the animation. Once the operating system has opened the file, the loader module 108 reads the animation header block to get all of data needed to play an animation and passes it to the sequencer as shown in step 152.

Figure 5:
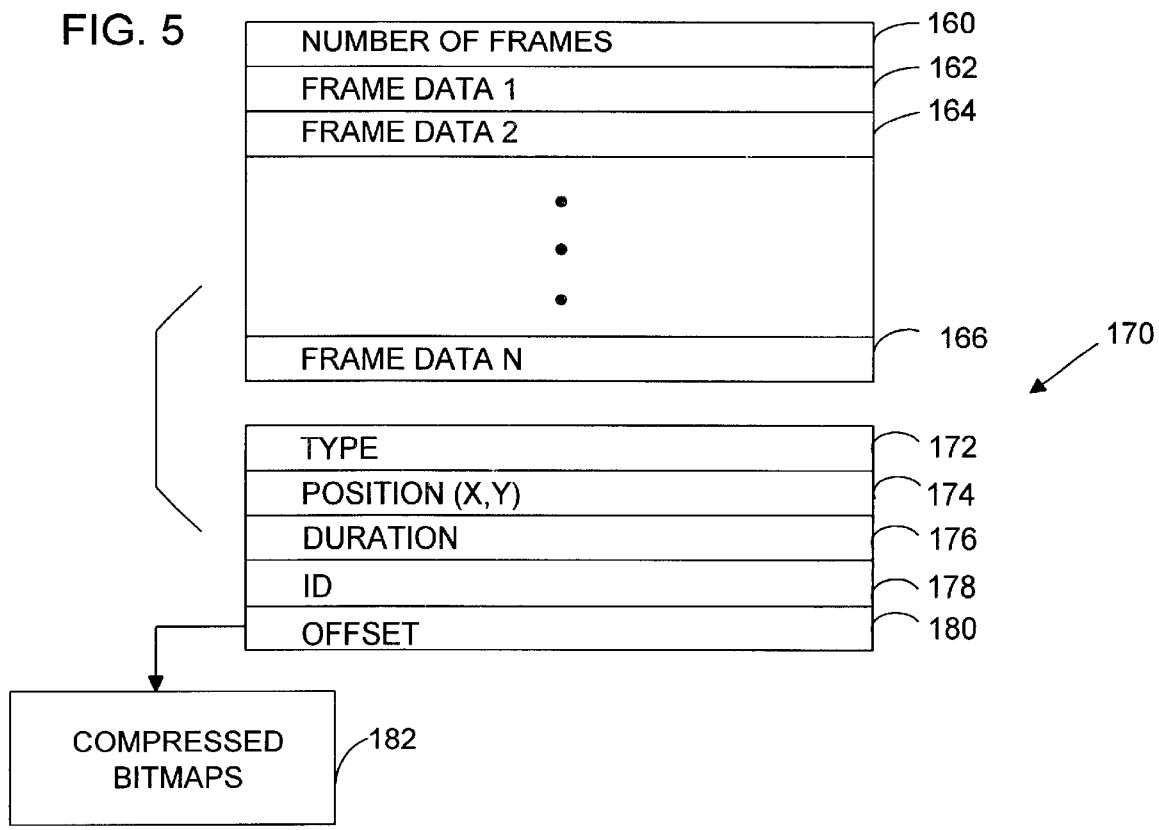
FIG. 5 illustrates an example of the animation file structure.

FIG. 5 illustrates an example of the animation file structure. The animation header lists the number of frames (160) and includes a block of data for each frame (see items 162–166 in FIG. 5 for example). The frame data 170 consists of a frame type (image, branch or sound) 172, frame position (x, y coordinates) 174, duration (in 60ths or a second) 176, a unique ID 178, and an offset 180 into the animation data file where the compressed bitmaps 182 for the frame reside. Animation branch frames allow developers to specify alternate pathways through the animation sequence other than the default sequential flow. Sound frames allow developers to specify digitized sound data to be played at a specific time in the animation sequence.

Back at FIG. 4, the process for playing animation continues at step 190, where the sequencer initializes the current frame number. Once the loader has successfully loaded the animation header block, the sequencer can start playing the animation. It initializes the current frame number to zero and looks at the type field of the current block of frame data to determine the type for the current frame.

The next step 192 is to get the frame data for the current frame as shown in step 192. When necessary, the loader loads the data for the current frame from the animation file as specified in the frame data block. The sequencer then constructs the frame from the data retrieved for the current frame as shown in step 194.

Figure 6:
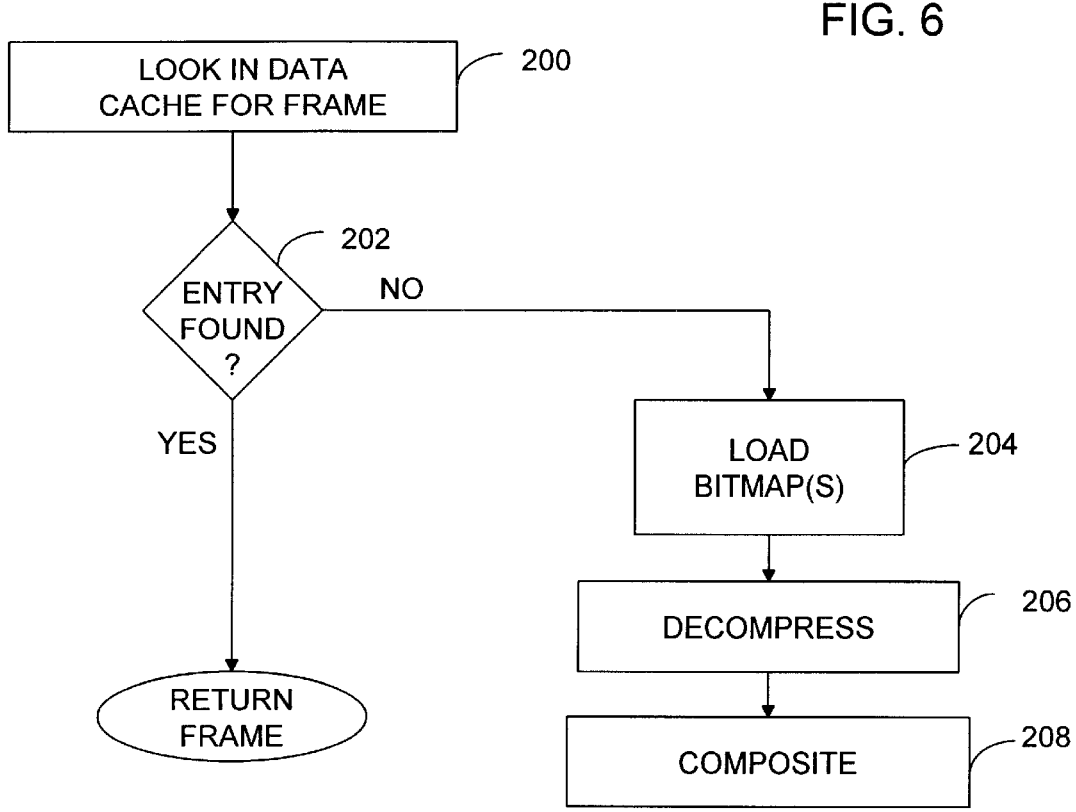
FIG. 6 is a flow diagram illustrating a method used to retrieve image data to construct a current frame of animation.

FIG. 6 is a flow diagram illustrating the method used to retrieve image data for the current frame. If the frame type is an image, the sequencer first looks in a data cache of frame bitmaps for an entry equal to the next frame's ID as shown in steps 200 and 202. The image data cache is a section of the computer's main memory where a fixed number of decompressed frame bitmaps reside in a most-recently-used queue (MRU). Data caching uncompressed frame bitmaps significantly improves overall performance of the animation system.

If the sequencer finds the frame ID in the data cache, it returns with the constructed frame that is already in the cache as shown in the flow diagram. If there is no entry in the data cache for the current frame, the sequencer passes a request on to the loader to load the required bitmaps for the specified frame. Each animation frame can be made up of multiple layered bitmaps. The loader uses the data offset for the frame from the animation header block to read all of the compressed bitmaps that make up the frame from the animation data file into the computer's memory (see step 204, FIG. 6).

Once in memory, the loader decompresses the individual bitmaps and combines them into a single decompressed bitmap as shown in steps 206 and 208. The loader constructs a composite bitmap by performing bit block transfers from the decompressed bitmaps to an off-screen buffer, which holds a composite bitmap. This composite bitmap is first saved in the data cache and then passed back to the sequencer where it can be used in generating the current frame. If the sequencer had initially found an entry in the data cache for the specified frame ID, it could have retrieved the composited, decompressed bitmap for the frame from the data cache. This step eliminates the need to decompress and composite the animation frame when it has already been done recently.

Once the sequencer has generated the appropriate decompressed bitmap for the current frame, it can pass control to the regionizer, which computes a bounding region for the frame if the bounding region is not already available. The bounding region defines the non-transparent portion of the constructed frame. For a solid object like the genie in FIG. 2, the bounding region is the boundary of the genie. Some objects can have transparent regions inside of them, in which case the bounding region defines the non-transparent portion and also describes any transparent portion within an object as well. A constructed frame of animation can have a number of disparate pieces which are not necessarily contiguous. The step of computing the bounding region (210, in FIG. 4) can be computed in real time, which means that the bounding region does not need to be pre-computed. Instead, the regionizer can compute the bounding region as it constructs and displays each frame.

Figure 7:
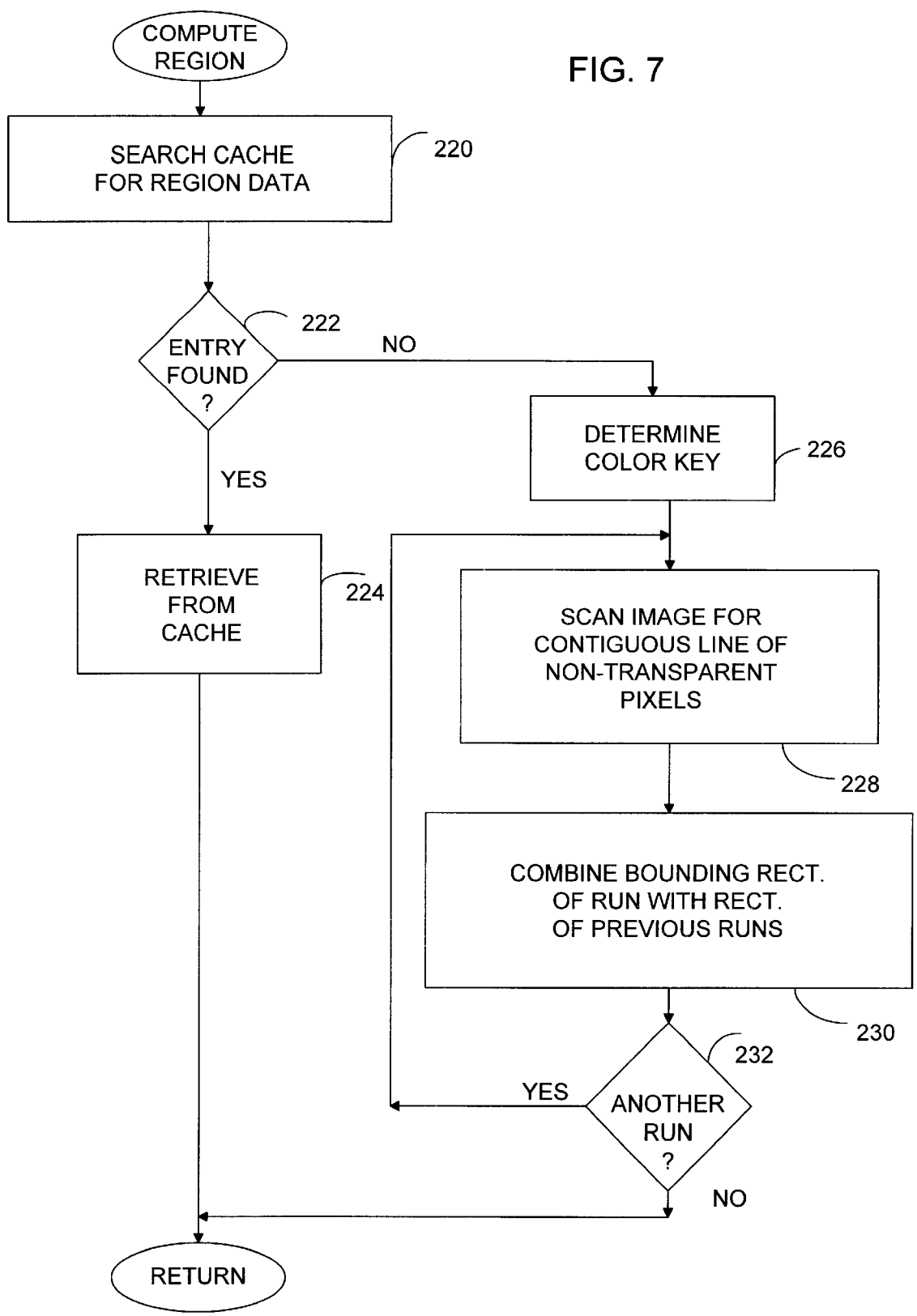
FIG. 7 is a flow diagram illustrating the process for obtaining the bounding region of an arbitrary shaped animation.

In this implementation, the regionizer takes one of three actions: 1) looks in a region data cache to see if the region data is already present; 2) on faster computers, generates the bounding region in real time; and 3) on slower computers, loads and uses a pre-computed bounding region. FIG. 7 is a flow diagram illustrating the process for obtaining the bounding region.

The first choice for the regionizer is to attempt to retrieve the necessary region data from a region data cache in main memory of the computer as shown in step 220 of FIG. 7. This cache works similarly to the image cache in that it is a most recently used queue (in other words, it is a last-used-first-out queue). If the necessary data is found in the data cache it is retrieved (see steps 222, 224).

If it is not in the queue, two alternate pathways are possible. FIG. 7 illustrates the steps performed on a fast computer where the regionizer computes the bounding region in real time. The animation server is able to determine whether to compute the bounding region in real time by checking the computer's registry.

If the computer executing the animation server is deemed fast enough, the regionizer will compute the bounding region of the decompressed bitmap frame in real-time. In this implementation, the regionizer computes the bounding region as shown in FIG. 7 and described below. First in step labeled 226, the regionizer determines which color (the color key) the bitmap is using to identify its transparent portions. The first pixel in the frame's bitmap (i.e. the pixel at location (0, 0) in rectangular coordinate space of the bitmap where (0,0 is the upper left hand corner) is deemed special in that it defines the transparent color of the frame. The pixel value of this transparent color is sometimes referred to as the color key. Using this color key, the regionizer scans the bitmap one line at a time looking for contiguous runs of non-transparent color as shown in step 228. When it finds a run of non-transparent pixels, it combines the bounding rectangle of the run with rectangles from previous runs 230. These rectangles always have a height of one, i.e. they are a single scan line of the bitmap, and have a width less than or equal to the total width of the bitmap. The operating system is responsible for combining the rectangles into non-rectangular regions in an optimized way. This process continues for every line in the bitmap until the entire bitmap has been completely scanned (as reflected generally by the loop back to step 228 from decision block 232). Upon completion, a single region is available that describes the bounding region of the animation frame.

On computer systems that are too slow to perform this type of processing in the time required by the animation server, the region data can be pre-processed during the animation development. The same process described above is used to generate the region data for each bitmap frame in the animation. The region data is then compressed and stored to a separate data file along with the animation data file. On slow systems, instead of generating the region data when it is needed, the data is simply read from a data file and decompressed. This method is far less CPU intensive than generating the region data in real-time which is important in low end PC systems. The disadvantage of this technique is that the region data for an animation can be quite large when stored to a data file, cannot be scaled (which is discussed further below), and is far less flexible in that it must be computed at the same time the animation is built. When the system is enhanced to support real-time rendered animations, this technique does not work because the bounding region needs to be generated in real time after the image has been modified, i.e. scaled, rotated, translated etc.

After the regionizer has retrieved the bounding region, either by generating it in real-time or by loading and decompressing it from a data file, it saves it in the region data cache for future use.

We now return again to the diagram in FIG. 4. At this point, the animation server has all of the components in memory that are necessary to display the next frame of the animation. The first step is to position the region window at the appropriate location as specified by the frame's x, y coordinate in the frame data block (see step 240 in FIG. 4). Calls to the operating system, such as SetWindowPos in the Windows Operating System, make this step possible.

The next step 242 is to set the animation frame window's region to the region generated by the regionizer. The operating system is responsible for sending the appropriate paint messages to any window that intersects with the previous region of the animation frame window so that this area can be redrawn. In response to receiving these messages, the application owning the window is responsible for repainting itself in the portion of its window altered by the animation.

One way to re-draw the portion of the desktop that is modified by the animation as it moves from frame to frame is to compute a bounding rectangle that encloses the animation in two consecutive frames and to re-compute the portion of the user interface that falls within this bounding rectangle. This bounding rectangle captures the animation in its current and previous frame. In other words, it includes the screen area once occupied by the animation in the previous frame as well as the screen area occupied by the animation in the current frame. The operating system instructs applications within this rectangle to redraw themselves. The portion of the desktop user interface within this rectangle is copied to an off-screen buffer. The animation server then instructs the operating system to draw the current frame of animation, clipped by its bounding region, to this off-screen buffer. Finally, the operating system performs a bit block transfer of this portion to the frame buffer to display the current frame of animation along with the re-drawn portion of the Windows desktop user interface, which is the background of the animation.

As shown in step 244 of FIG. 4, the animation server draws the decompressed, composited bitmap generated by the sequencer to the animation frame's region window. The operating system clips this bitmap to the bounding region of the window (which exactly matches the non-transparent pixels of the composited bitmap). The sequencer then sets an operating system timer to go off after an amount of time equal to the duration specified in the frame data (see step 246).

When the timer goes off, the entire process is repeated for the next frame in the animation. This is illustrated in FIG. 4 by the timer-up message 248.

The animation server employs a similar technique to animate a portion of an animated character representing the character's mouth. The animation server loads, decompresses, and caches bitmaps representing the character's mouth. To create the illusion of speech, the animation server draws a bitmap representing the mouth on top of the constructed frame representing the character at the (x, y) coordinates where the character's mouth is located.

In this implementation, the servers maintains bitmaps representing the character's mouth in a variety of different positions in a mouth animation file. There are a number of different bitmaps, each representing the position of the mouth for a corresponding phoneme. To enhance realism, the server can maintain different sets of mouth data files and select the appropriate one based on the position of the character. Each set of mouth data files can map a set of phonemes to bitmaps representing the mouth position for a phoneme.

To lip-synch the mouth animation with the speech output, the server instructs the speech synthesis engine to notify it before it generates speech output for a phoneme. Just before the speech synthesis engine is about to output a phoneme, it passes a message to the mouth animation module identifying the phoneme. The mouth animation module loads the animation and draws at the (x,y) location on top of the current frame of animation.

If the region data is being generated in real-time, animations can be scaled and played back at a size different from the size that the animation was originally developed at. The entire process as described above is essentially the same. The main difference is that the sequencer can scale the composited, decompressed bitmap returned by the loader using the specified scaling factor. The regionizer works on decompressed bitmaps stored in memory and needs no knowledge of the size of the original source of the bitmap or any scaling factor. The operating system can be used to perform scaling of bitmaps in an efficient manner. Once the bitmap is scaled it can be passed to the regionizer and the system works as described above. Allowing scaling of animations in real-time is important because it allows end users to have greater control over the look and feel of the system.

Another significant feature of this implementation is the way in which the animation's moving, non-rectangular window receives cursor device input from the user. Since the animation server repetitively updates the bounding region of the animation for each frame, the active area of the animation always corresponds to the non-transparent portion of the current frame. Thus, the operating system only notifies the server of cursor input (e.g. right and left mouse clicks) when the cursor is positioned within the non-transparent portion of the current frame. This form of interactive behavior enhances the effect of the animation operating outside the focus of any rectangular windows currently displayed on the Windows desktop user interface.

Second Implementation of the Animation System

The second implementation of the animation system is similar to the first animation system in that it generates arbitrary shaped animation and can also generate a bounding region for a frame of animation in real time. From the stand-point of the user, this implementation generates arbitrary-shaped animation with similar behavior as the first implementation. Namely, it produces arbitrary shaped animation and plays a sequence of animation in the foreground of the user interface such that the animation is not limited to a window of a host application or to a window of an application that requests playback of the animation. However, it has some differences: 1) the system does not load individual bitmaps and then construct each frame from separate bitmaps, but instead, loads constructed frames; 2) it does not cache region data in a MRU cache in main memory as above, but instead, caches all regions in secondary storage (e.g., on a computer's hard disk) as they are generated; and 3) it has the additional capability to pre-compute region data on a low priority thread.

Below we describe these and other implementation details. We describe this system using the example of an animated "character," an animation that has life-like gestures. One example of this type of character is the genie shown in FIG. 2. Although it is described using the specific example of an animated character, this animation system can be applied to other forms of arbitrary shaped animation as well.

The system first gets a request to open a character file. The file contains character, animation and audio data and is a structured storage file (see "Inside OLE" by Kraig Brockschmidt for a description) which contains all of the data necessary to play region window animations. At this time, the calling module can register itself to receive event notifications that describe the current state of the animation system at various times. Once the file is successfully opened, the character data stream is read into memory and the character is initialized. The data included in the character data stream includes the character's color table, an index into the color table that defines the transparent color (or color key), size information (i.e. width and height of the character frame), audio definition data, animation version information and any other data necessary for initialization of the character. A window is then created of the appropriate size but is not made visible until explicitly done so by the calling module (such as a client program to the animation server). A logical palette is created from color table information retrieved from the character data stream. The character is now initialized and is ready for animation requests.

Each animation is stored in a separate data stream in the structured storage file. When an animation is requested to be played, the system finds the appropriate data stream and begins loading it into memory. Animation data consists of a sequence of animation frame data. Frame data consists of all of the data necessary to render an animation frame to the display device. This consists of the actual image bits for the frame, as well as a duration, coordinate offsets, frame branching logic, and lip-synched mouth image data (described further below). If the image bits are in a compressed format they are decompressed. Note that in this implementation, the frame is already constructed in the sense that it does not have to be assembled by combining more than one bitmap. As demonstrated in the first implementation, it is possible to construct frames in real time as opposed to using pre-constructed frames.

After the animation data has been successfully loaded and decompressed, the animation can be played. The animation is played by first rendering the uncompressed frame image data for the next frame to an offscreen video memory buffer. The animation system then creates a window region from the buffer that defines all areas of the image that are non-transparent. The algorithm for creating the region is as follows:

ImageRegion=empty
for each scan line in the image
   for each run of non-transparent pixels in the scan line
     create a rectangular region of height one
     combine the region with ImageRegion
   end loop It is important to note that the above method also works for images that contain either "holes" or more than one disjoint region. A "hole" is a transparent region completely surrounded by a non-transparent region. A disjoint region is any non-transparent region completely surrounded by either transparent pixels or the boundaries of the image. "Holes" can contain any number of disjoint regions within themselves. The image region is defined to be the list of non-transparent regions. The image region is analogous to the "bounding region" described in the first implementation and the terms can be used interchangeably. In both cases, the region defines the location of non-rectangular, non-transparent image portions whether or not they comprise a contiguous group of pixels or disjoint groups of contiguous pixels.

Once the image region is generated, the operating system is called to assign the region to the window. The operating system is responsible for clipping all input and output to the region associated with a window. After the region has been set, the image data can be copied from the offscreen memory buffer to the display device, using the operating system's bit block transfer, where it will be clipped to the bounding region assigned to the window. The Windows Operating System, for example, has an application programming interfaces (APIs) that support bit block transfers to offscreen buffers. Input and output are clipped to the list of (possibly) disjoint regions that make up the image region.

After the frame image is rendered to the display device, an operating system timer is set to go off in the amount of time specified by the frame's duration. When the timer goes off, the animation system must determine the next frame to render. If the frame contains no branching logic, the system determines if it is the last frame in the animation and notifies the calling module of the completion (if the module registered itself to receive event notifications). If it is not the last frame, the next frame is either the next frame in sequential order, or the frame specified in the branching logic for the current frame.

Branching logic is defined by specifying a frame number to branch to and a percentage of time that the branch should be taken. Multiple branches can be defined as long as the total percentage does not exceed 100%. The first branch is given a branch probability between 1 and it's percentage. Subsequent branches are given a probability between the maximum probability of the previous branch plus one to that value plus their percentage. To determine which branch to take, the animation system generates a random number between 1 and 100 and starts searching sequentially through the frame branches until it finds a branch whose maximum probability is less than or equal to the random number. If no branch can be found, the next sequential frame is selected.

Once the next frame number is known, the system can repeat the process of rendering, region generation, and displaying of the frame image data. The repetition of this process is an animation.

The generation of the region data for an animation frame in real-time is "expensive" in terms of CPU cycles. Thus a system of region caching has been implemented. It would be beneficial if the region data could be processed at character development time and saved along with the character animation data. This is possible but has serious limitations. If the region data is pre-processed, the character can not be scaled at run-time. The character data file also has to store all of the region data for every frame in every animation. The data can be quite large. This is not a problem when the entire character data file resides on the local machine running the animation system. However, the animation supports incremental downloading of animation data over low bandwidth communication lines such as the Internet. Downloading the region data for a character would be extremely slow. Thus a hybrid approach to region generation is used in this alternative implementation. The approach minimizes the download time associated with a character data file and minimizes the CPU cycles needed to generate regions in real-time.

When a region for an animation frame needs to be rendered, the system will first look in a local storage cache of regions for a match. In contrast to the fixed sized MRU cache in the first implementation, this cache is located in secondary storage, i.e. the hard disk. If the region is found it can be loaded from disk very fast and assigned to window as described above. If the region is not found, it is generated in real-time and used as described above. However, after the region is used it is saved to the region cache on disk. The next time the region is required it can simply be read from the cache instead of being generated in real-time. Thus, the system gets the benefit of the pre-computed region without it having to have been downloaded over a possibly low bandwidth communications link. This gives the system the appearance of improved performance over time, i.e. the more frames that are displayed (which results in region generation and thus caching), the better the performance.

The system can also pre-generate regions on a low priority background thread when the animation system is idle. When the character is loaded, the region generation thread is started in a suspended mode. Whenever the system is idle, it resumes the thread (in low priority) which starts generating regions for any animation frame that does not already have an entry in the cache. The thread runs at a very low priority so that it does not unnecessarily steal CPU cycles from other applications currently running. The thread is suspended when the animation system becomes active. Over time, every animation frame in the character data file will have a pre-computed region in the cache. Once this is accomplished the region generation thread can be terminated.

On low-end systems that are simply not capable of ever generating regions in real-time, the computation of regions must be done before the system can be used. This can be done at character installation time when the user commonly expects a delay.

Regions are directly linked to frame images at a given scale. The default scale of an animation frame is 100%, i.e. the frame should be displayed at its actual size. The animation system supports scaling of animations. This has the advantage that animations can be played at a size that is relative to the resolution of the display being used. This is necessary to overcome the problem that an animation created at a certain size looks bigger or smaller depending on both the resolution and physical size of the display device.

Caching region does improve performance by reducing the need to re-compute region data. However, if the user or a client application wishes to scale an animation (enlarge or reduce its screen size), cached region data cannot be used because it is the wrong size. Therefore, when the scale of an animation changes, all pre-computed regions are deemed unusable and must be recomputed. Thus, the entire region cache must be flushed and regenerated. The region generation thread must be restarted or reset (if it is still running). This process is quite expensive but is acceptable because scaling is something that users will typically do infrequently.

The animation system supports the incremental downloading of animations from a remote site. This is extremely beneficial for running the system over low bandwidth communication links. When a character is loaded from a remote site, only the character data stream is initially downloaded. The character data stream contains all of the data necessary to initialize the character. If a character data stream already exists on the local machine, the downloaded data is compared to the local data to determine if any animations currently stored locally have been superseded by a newer version on the remote site. If so, those animations are marked so that if a request for the animation is made the system knows that it must retrieve the newer version from the remote site. No animation data is downloaded. The character data stream is typically very small so the system can be initialized quite quickly. When a request for an animation is made, the system looks in the character data file on the local storage device. If the animation is found, it is loaded and played as described above. If the animation is not found it is downloaded from the remote site. Once the download is complete, the animation can be played as described above.

It is desirable for calling modules (e.g., clients) to have control over when animations get downloaded. For instance, the calling module may want to download several animations that are played in sequence. If none of the animations reside locally, the system would download the first animation, play the animation, download the next animation, play it, etc. This is obviously not the desired effect. Thus, the animation system allows callers to download sets of animation. When a calling module requests an animation to be downloaded, the system first checks to see whether or not the animations reside locally. If it does, the system simply returns. If it does not the system begins the process of downloading the animations from the remote site. It can do this in a asynchronous fashion. The system also supports a notification API so that calling modules can download animations asynchronously and then be notified when they have been downloaded. Thus in the example above the calling module could do the following:

Request=Get "Animation 1", Get "Animation 2", Get "Animation 3"

On Request Complete

Play "Animation 1"

Play "Animation 2"

Play "Animation 3"

This results in a request for the three animations to be downloaded at the same time. The "Request Complete" event indicates that all of the animations reside locally can be played one after another without any delays. Animations do not have to be explicitly downloaded. If an animation is requested that is not stored locally, the system adds an implicit download call. The above scheme also works for audio data files that may be associated with an animation.

Asynchronous download calls are always temporarily interrupted by synchronous calls. Thus, if the calling module asynchronously downloads an animation and a synchronous animation request is generated as a result of end user interaction, the synchronous requests gets priority. This follows the notion that the end user really is in control of setting the priority for animation downloads.

As demonstrated by the alternative implementations described here, there are a number of different ways to implement the animation system, and therefore, it is not limited to these specific implementations. The cache for region data in the first implementation is a better design in cases where the same animations are used repeatedly in a short period of time because the MRU cache is more fully utilized, and it is quicker to read region data from main memory rather than retrieve it from secondary storage. However, it is often more likely that clients will make requests for different animations, rather than make repeated requests to play a small number of animations over and over. In these cases, the second implementation has better performance because all region data is cached in secondary storage as it is computed, rather than being limited to a fixed size MRU cache. Since region data is computed in real time along with an animation request and is also pre-computed before a request using a background thread, the second implementation will approach a cache hit rate of 100% over time. Depending on the desired performance and the nature of the animation requests, an animation system can be implemented using different combinations of the features described above to optimize performance.

It is important to point out that there are other possible implementations of an animation system. For example, one can abstract the general method described in the previous sections with a client/server architecture. In this abstract form, the processes used to draw animations on the screen are divided into two separate classes of operation. The file I/O, the cache, and all other data used for generating the character animations are accessed through an OLE COM server called an "animation data provider." The regionizer and the sequencer reside in a client. (This client can, in turn, provide services to other programs on the computer.) This abstract representation allows the animation system to use bitmaps that are represented in arbitrary formats on secondary storage. It also allows the animation system to provide smooth transitions from one posture to another for arbitrary animated characters. This frees the system from any fixed character file format, as well as reducing the dependence of the animation system on the Windows operating system.

In one implementation of this client/server architecture, the animation system calls into the animation data provider through certain COM interfaces. Significantly, this implementation of the client/server architecture does not depend on any particular file format. It only depends upon the animation data provider's ability to construct bitmap representations of the current frame of the animation of the character, and to pass those on to the server at a relatively high speed. These COM interfaces allow the animation system to obtain information about the character in general, as well as information about the specific poses of the character. Thus, they provide access to all of the character's properties, including its name, its size, the number of bit planes in each animation bitmap, as well as to the animation bitmaps themselves. In addition, these COM interfaces allow the animation system to pass provider-defined state information to different animation data providers. This state information can be encoded in a form that only those data providers understand, providing a degree of protection for the content of the character. Finally, these COM interfaces are optimized to reduce the costs of accessing this data. This optimization is necessary in order to handle the case of an application client with a dedicated animation data provider. It has two parts. First, animation data providers can support standard OLE COM interfaces through which their persistent state can be captured so that each instance of an animation data provider can be reconstituted inside the server process. In addition, the COM interfaces used specifically to provide animation data are optimized to store and pass that data in a format particularly well-suited to transfer across process boundaries.

Animation Server COM Object Implementation

The animation services described above are implemented as a Component Object Model (COM) based OLE Automation Servers. For a detailed discussion of OLE see Inside OLE, Second Edition by Kraig Brockschmidt, Microsoft Press, Redmond, Wash. 1995. The COM server implements a set of animation services that can be used by an unlimited number of clients, which are typically application programs. These clients can connect to the server using either a C/C++ COM Application Programming Interface (API) or via a Microsoft ActiveX Control interface. The ActiveX control allows access to all of the functionality of the COM server while providing an interface that is easy to use and abstracts the COM server's interface to a higher level.

COM Object Overview

In object oriented programming terminology, an "object" is an instance of a programmer-defined type referred to as a class, which exhibits the characteristics of data encapsulation, polymorphism and inheritance. A class is the definition of a data structure and the functions that manipulate that structure (member functions).

Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. Programs that wish to use an object do not access the object's data directly, but must instead call functions on the object's interfaces to operate on the data. An interface is explained further below, but in general, is a group of related functions that a program can invoke to access an object's data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class (which for purposes of OLE are the interfaces of the base class).

Figure 8:
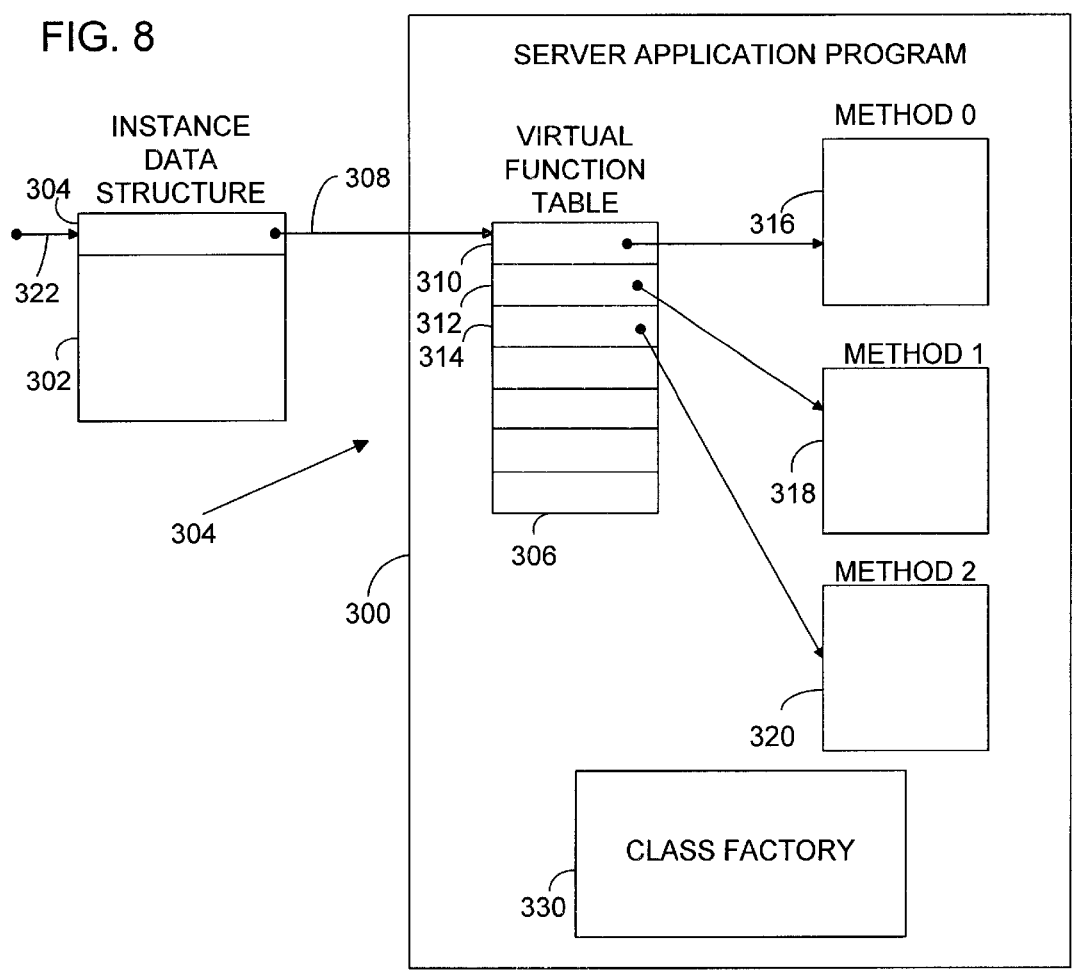
FIG. 8 is a diagram illustrating an example of a COM server and its relationship with an instance of object data.

OLE's COM specification defines binary standards for objects and their interfaces which facilitate the integration of software components. FIG. 8 is a diagram illustrating an example of a COM server 300 and its relationship with an instance of object data 302. According to the COM specification, an instance of an object is represented in the computer system 20 (FIG. 1) by an instance data structure 304 and a virtual function table 306. The instance data structure 304 contains a pointer 308 to the virtual function table 306 and data 302 (also referred to as data members, or properties of the object). A pointer is a data value that holds the address of an item in memory. The virtual function table 306 contains entries 310–314 for member functions 316–320 implemented in the server. Each of the entries 310–314 contains a reference to the code 316–320 that implements the corresponding member function.

An interface to an object is a group of semantically related functions that are publicly accessible to software that wishes to use the object (e.g., a client program). The interface is implemented in the computer memory as a block of the memory containing an array of function pointers, illustrated as the function table 306 in FIG. 8. The interface's definition are the names for each function in the virtual function table. An object may support more than one interface. If an object has more than one interface. the object has a function table and corresponding set of related functions for each interface.

Client programs interact with the object by obtaining a pointer (referred to as an interface pointer) 322 to the pointer 308 of the virtual function table 306. OLE includes a type definition of an interface pointer which allows client programs to call member functions on the interface by name through the interface pointer and provides type checking on the function's arguments, as expressed in the following code (in the C++ programming language):

pInterface->MemberFunction(. . .)

By convention, the interfaces of an object are illustrated graphically as a plug-in jack. Also, Interfaces conventionally are given names beginning with a capital "I." Objects can include multiple interfaces which are implemented with one or more virtual function tables. The member function of an interface is denoted as "IinterfaceName::FunctionName."

Figure 9:
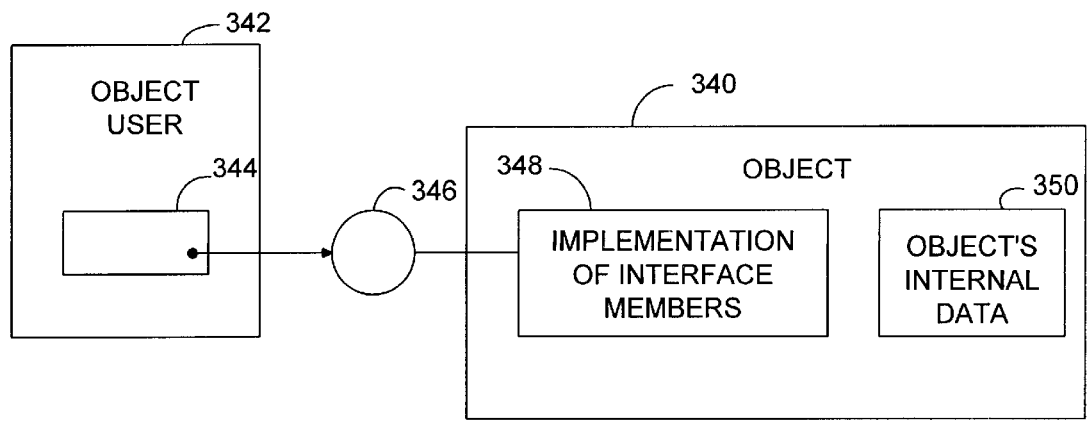
FIG. 9 is a conceptual diagram illustrating the relationship between a COM object and a user of the object (such as a client program).

FIG. 9 is a conceptual diagram illustrating the relationship between a COM object 340 and a user 342 of the object (such as a client program). The user of the object has a pointer 344 to the one of the object's interfaces, which is represented by a plug-in jack 346. The object includes code 348 implementing the member functions in the object's interface, and it also includes the encapsulated data 350, accessible via the object's interface. An OLE server, such as the animation server, can include a number of interfaces which allow clients of the server to access an instance of an object, such as an interactive character animation encapsulated within an object.

The object conforming to the COM specification exhibits data encapsulation by exposing its interfaces to client programs. The client programs interact with the object by calling the member functions 348 on a particular interface of the object, but do not directly manipulate the object's data 350. A COM object also exhibits polymorphism and inheritance in that it can provide interfaces in common with a base class and other similar objects, so that client programs can interact with each of the objects in the same manner by calling member functions of the interface that the objects have in common.

OLE Server Overview

To describe an OLE server, we turn again to the example in FIG. 8. The virtual function table 306 and member functions 316–320 of the object are provided by a server program 300 which is stored in the computer system 20 (FIG. 1) as an executable program file (with a ".exe" file name extension) or as a dynamic link library file (with a ".dll" file name extension). Dynamic link library files are loaded, dynamically linked, and executed by the Windows 95 operating system in a same process with a client application program. Executable program files are loaded by the operating system as a separately executing process. In the OLE specification, the server application 300 includes code for the virtual function table 306 (FIG. 8) and member functions 316–320 (FIG. 8) of the classes that it supports, and also includes a class factory 330 that generates the instance data structure 304 (FIG. 8) for an object of the class.

A server program can be written by a programmer to support a particular class of object that contains any desired data. The animation server, for example, provides objects representing an interactive animation. This allows a client program (such as the clients shown in FIG. 3) to interact with the interactive animation through interfaces of the OLE object.

For the client program to interact with an instance of a COM object provided by the server 300, the server must first create the object (i.e., instantiate an object of a class supported by the server application) and the client must gain an interface pointer to the object (pointer 322, for example). In OLE, the client program realizes these events using services provided by OLE and a set of standard object interfaces defined by COM based on class and interface identifiers assigned to the object's class and interfaces. More specifically, the services are available to client programs as application programming interface (API) functions provided in the COM library, which is part of a component of the Windows7 operating system in a file named "OLE32.DLL." In OLE, classes of objects are uniquely associated with class identifiers ("CLSIDs"). Class identifiers are 128-bit globally unique identifiers ("GUID") that the programmer creates with an OLE service named "CoCreateGUID" and assigns to the respective classes. The interfaces of an object are associated with interface identifiers ("IIDs").

In particular, the COM library provides an API function, "CoCreateInstance," that the client program can call to request creation of an object to encapsulate a particular animation's data using a CLSID associated with the data. The CoCreateInstance API function creates an instance of the object and returns a pointer of the requested interface to the client program.

Once the client program has obtained a first interface pointer to the object, the client obtains pointers to other desired interfaces of the object using the interface identifier associated with the desired interface. COM defines several standard interfaces generally supported by OLE objects including the IUnknown interface. This interface includes a member function named "QueryInterface." The QueryInterface function can be called with an interface identifier as an argument, and returns a pointer to the interface associated with that interface identifier. By convention, the IUnknown interface's member functions are included as part of each interface on an object. Thus, any interface pointer that the client obtains to an interface of the object 80 can be used to call the QueryInterface function.

As noted above, the animation server is implemented as an "OLE Automation server." The term "automation" in this context refers to how the OLE object exposes a set of commands or functions that another piece of code can invoke. OLE automation enables an application to control another application's objects programmatically. In other words, automation provides a way for a program to manipulate an application's objects from outside the application.

In OLE automation, a software object exposes itself as a series of methods, properties and events. A property is an attribute, such as a color, the zip code section or the postal code section of an address, or another object. A method generally refers to a request to an object to perform a specific action. Finally, an event is a notification from an object that something has happened. An event is similar to a method call except that it occurs from the object to its client.

Properties have data types. For example, the postal code section of an address can be a string or a long integer. Properties can also be parameterized, which is useful to construct an array of one type representing a collection of properties (e.g., the lines of an address). In this type of property, a parameter representing an index in the array is defined for the property. Methods can also take parameters and return results.

OLE automation also allows for hierarchies of automation objects by allowing methods and properties to return pointers to other objects. For example a series of related attributes can be represented within an object, which represents each of the attributes as a property.

In OLE, a software object's properties and methods can be exposed to outside applications through 1) a standard OLE interface called IDispatch, and 2) through interface methods and property access functions that applications can call directly. IDispatch provides outside access to an object's methods and properties through one of its methods called the Invoke method. For instance, a program can ask an OLE object to return a property or can call one of its methods by calling the Invoke method on the IDispatch interface of the object and identifying the property or method by its ID. The IDispatch interface includes other methods to enable a program to get an ID of a method or property, and to get data type information. An OLE object can expose methods that can be called directly, rather than through the Invoke method in the IDispatch interface. For example, an OLE object can expose a set of functions that is derived from IDispatch and includes method and property access functions that another program can call directly. This is sometimes called a 'dual' interface because other programs can invoke an object's methods through the Idispatch interface and directly through this second type of interface.

An OLE control is a type of OLE object that uses OLE Automation to expose properties and methods and to provide support for events. An OLE control object is typically designed to be incorporated into a host application called a container. In the context of OLE controls, an event is a notification from the control to its container that something has happened. In OLE controls, events are typically implemented as standard OLE automation methods, except that the automation interface for these methods is implemented in the container, not the control. When a control wants to fire an event, it calls the container method associated with the event. For instance, the control can call the proper container method to fire the event through the IDispatch:: Invoke method of the container.

An OLE object can tell another object that it is the consumer of the other object's interface through a mechanism known as a connection point. A connection point is an interface exposed by an object that is used to hook up to an implementation of an interface with which the object wants to communicate. In the case of control events, a control describes the event interface in terms of an OLE automation interface in its type library, marking the interface as "source." This means that the control does not implement the interface. The control then provides a connection point through which the container can connect its implementation. A connection point can be defined as an implementation of the IConnectionPoint interface. The container gets the connection point through another interface called IConnectionPointContainer, which allows an external object to iterate list of connection points maintained by a control.

The Animation Server

Figure 10:
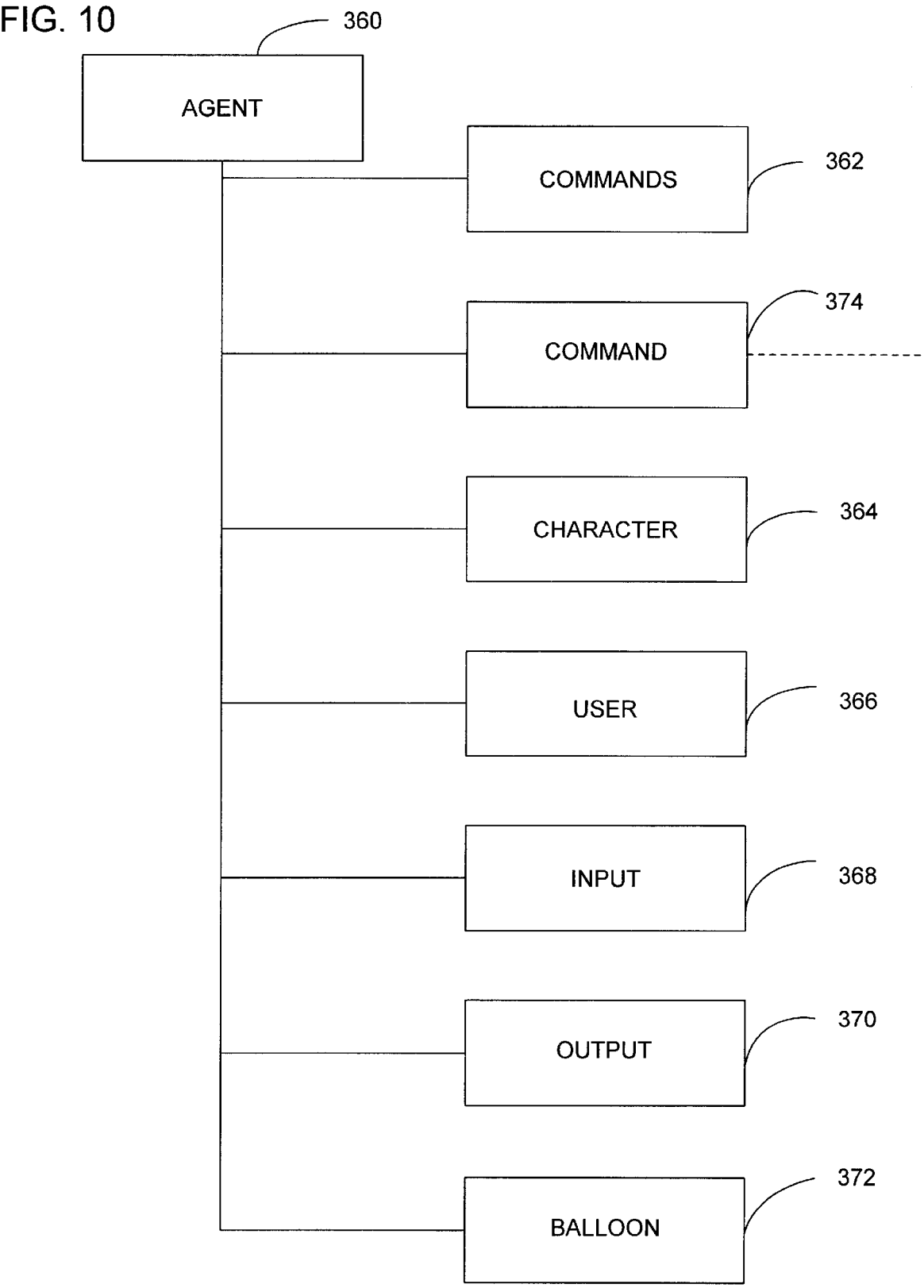
FIG. 10 illustrates the relationship among the different types of objects supported in the animation server.

The animation server shown in FIG. 3 is implemented as an OLE Server. FIG. 10 illustrates the hierarchy of the objects supported in the animation server. The top level object is the agent object 360, which represents an interactive, animated user interface character called an agent. An example of this type of character is the genie in FIG. 2.

The other objects include a commands object 362, character objects 364, a user object 366, an input object 368, an output object 370 and a balloon object 372. The commands object can have several command objects 374, which represent individual input commands that a client has specified for an agent.

Below, we describe the methods, properties and events that make up the interfaces to the objects supported in the animation server. Clients can include code that directly invokes the objects implemented in the animation server using ActiveX (OLE) interfaces. Alternatively, a client can access the methods, properties and events of the objects implemented in the animation server through an OLE control representing an animated character. For example in the Visual Basic Programming Environment from Microsoft, software developers can insert an OLE control representing an animated character into a Visual Basic form. The Visual Basic programming environment gives the developer high level access to the methods, properties and events of the animation server using conventional Visual Basic syntax. A description of examples of the methods properties and events that OLE controls expose follows below.

The OLE control acts as a high level programming interface to the animation server. When a piece of code, such as a Visual Basic application program, invokes a method or property on the OLE control, the OLE control routes the method or property request to the corresponding method or property in the animation server. The OLE control, thus, acts as a thin software layer that enables programmatic access to the methods and properties of the software objects in the animation server. The Visual Basic programming environment also provides support for receiving event notification from the animation server. When the developer inserts a control representing a character into a Visual Basic form and creates a Visual Basic application, the Visual Basic programming environment adds the necessary support for receiving event notification to the application. This event notification mechanism is similar to the event notification mechanism used to communicate events from an OLE control to a container of an OLE control.

In a typical implementation of a Visual Basic application that includes an animated character control, the operating system dynamically loads the character control in the process space of the application. The Visual Basic application can access the methods and properties of the control, which in turn, accesses the corresponding methods and properties in the animation server running in a separate process.

The OLE control based design also enables developers to create script code in Visual Basic Script that accesses the methods, properties and events of the animation server through the OLE control interface. One important use of this technology is adding an animated character to an HTML document and controlling the character through script code in the document. In this particular use of the invention, the HTML document is parsed and rendered by an application program, such as an Internet browser application. In one possible implementation, the browser loads the character control in its process space when it encounters an object identifier in the HTML page corresponding to the character control. When it encounters the script code in the HTML page, the browser uses an interpreter, loaded in its process space, to translate the script. To execute the script and allow it to access the animation server, the browser control communicates requests to access methods and properties to the interface of the in-process control, which in turn, accesses the corresponding methods and properties in the out of process animation server.

It is important to note that these uses of the animated character control are only examples. The invention does not necessarily require that the animation server be accessed through an OLE automation interface. There are alternative ways to access an out of process animation server, and the use of an OLE control is just one possible method of programmatically accessing the animation server.

We now turn to specific examples of the methods, properties and events of the objects implemented in the animation server. Below we describe methods, properties and events of the server's ActiveX control interface in more detail.

The Agent Object

Clients of the animation server access its animation services using the methods, properties and events of the agent object's interface. The methods of the agent object include a number of functions to control the playback of an animation. Example methods include: Play, GestureAt, MoveTo, Stop, and Speak.

Play—A client invokes this method to ask the server to play a specified animation sequence. The client specifies the animation sequence by passing a string that specifies the name of the animation sequence.

To display the requested animation, the server uses the animation technique described above in detail.

GestureAt—Clients use this method to cause the animation to gesture at a specified location. When invoking this method, the client provides two integer values representing the screen coordinates (x,y) in pixels where the character should gesture at. The character author assigns animations corresponding to different coordinates to this method, and at runtime, the server determines which of these animations to play based on the current location of the character and the coordinates specified by the client.

Move to—This method moves the animation to a specified location in screen coordinates.

Stop—Clients invoke this method to halt the current animation and play the next queued animation.

Speak—Clients invoke this method to instruct the server to generate speech output for a specified text string.

Clients specify a text string, which the speech output engine converts into digitized audio output.

The animation server plays lip synched animation of the agent's mouth along with the speech output. Once the speech synthesis engine and agent mouth data is loaded on an end user's machine, the server can play the ASCII text requested by a client. When the server processes a client request to speak, it passes the appropriate text to the speech synthesis engine. The speech synthesis engine then processes the text and begins sending data to the physical audio device (e.g., sound card installed in the PC).

The speech synthesis engine (discussed above in conjuction with FIG. 3) can send a notification to the mouth animation module (discussed above in conjuction with FIG. 3) of the server whenever a specific phoneme is about to be spoken. When the mouth animation module receives this notification, it performs a mapping of the specified phoneme to appropriate data stored in the animation mouth data file. The mouth data consists of an x,y coordinate, a width and height, and a compressed bitmap of a mouth that appropriately matches the phoneme to be spoken. The mouth bitmap can then be loaded from the data file into memory, decompressed, and drawn on top of the current frame that the server is currently displaying at the coordinates of the animation's mouth. This action is repeated for every phoneme that is synthesized by the speech synthesis engine. This gives the illusion that the character is actually speaking the symthesized audio.

It is important to note that the mouth bitmaps that correspond to the various phonemes that are generated are completely bounded by the region of the current animation frame. No region processing is performed during or as a result of the drawing of the mouth. In order to maintain lip synch with the above technique, the process of preparing and drawing the appropriate mouth for a specific phoneme must be done extremely fast. Performing any additional CPU intensive processing will result in the lip synching falling behind.

The server also embeds what are referred to as tags in every piece of text that is passed to the speech synthesis engine. These tags are inserted before every word in the text and tell the speech synthesis engine that the server wants to be notified whenever one of these tags is encountered. The server can then uses this data to display the word that is currently being spoken in a visual user interface. This technique can then be used effectively to close caption the text as it is being spoken. In this implementation, the server displays this text in a graphic representing a balloon.

The client can use a special type of tag called a bookmark tag in Speak method statement to sync its operations with the output text. The bookmark tag is a tag supplied by the client along with the ASCII text that tells the server when to notify the client. For example, to display a window at a particular point in its spoken output, the programmer inserts a bookmark tag at the desired location in the output string. When the server encounters the bookmark tag in the output text, it generates a Bookmark event with the bookmark number you specified in the tag.

Agent1.Speak "Generate a bookmark now\mrk=100.\"

While generating speech output, the Speak method automatically selects the animation of the agent based on the last animation played. The Speak method uses the last action played to determine which speaking animation to play. For example, if the client precedes the Speak command with a command to play an animation called GestureRight, the server will play GestureRight animation and then the GestureRight speaking animation. However, if the preceding animation ends at the rest pose, the server will play the RestPose speaking animation.

Playing a speaking animation also automatically disables the listening mode while the associated animation is played.

Agent Object Events

In general, events are notifications from the animation server that something has happened for which a client should be notified. They, for the most part, are asynchronous, but in some cases, can be synchronous. In the context of event notification in this implementation, asynchronous event handling means that the piece of code that monitors the event spawns a separate thread to fire the event so that the code can continue processing after it fires the event. Synchronous event handling means that the piece of code that monitors the event does not spawn a separate thread to fire the event but instead, fires the event on the current thread of execution and waits until the event is processed before continuing. In the case of the animation server, the server is responsible for firing events to clients, whether they are application programs or a character control within an application program (such as a Visual Basic application) or a script (such as a Visual Basic Script embedded in an HTML document). In the latter case of a character control, the control acts as a gateway for communicating events.

Most of the events generated in the OLE implementation of the animation server are asynchronous, meaning that they spawn a separate thread to fire an event. This is beneficial to performance because the animation server can continue executing without waiting for the client to finish processing an event. However, some events, like QueryServerShutdown, are synchronous because it is important for the server to wait for the client to finish processing the event before continuing.

One form of event notification is a callback function where the client requesting notification of an event provides the name and location of a function to call when a predefined event occurs. For example in OLE, this callback can be implemented as an IDispatch interface of the client that the animation server can invoke when it detects an event. has occurred. For asynchronous events, the callback function is made on a separate thread of execution, while for synchronous events, the callback is made on the same thread.

The agent object's events allow the client program to track the state of an agent. Examples of these types of events include: Input Activate, Input Deactivate, Command, Shutdown, Bookmark.

Input Activate event—The server generates this event when a client becomes active for input from the server.

Input Deactivate event—The server generates this event when a client has been deactivated for input from the server.

The server uses the activate and deactivate events to arbitrate among requests from clients for input services. The active client is the client that receives mouse and speech input from the server.

Bookmark event—The server generates this event when it encounters a bookmark tag in a text string as it converts the text string into speech output. The client can insert this tag in the text string provided with a Speak method. To distinguish between bookmark tags, the client specifies a tag ID for the bookmark when it passes the text to the server.

Command event—This event occurs then the user chooses an input command of an agent (e.g., clicks on the agent's command window). In one implementation of the agent, right-clicking the mouse button while the cursor is positioned over the character displays a pop-up menu, selecting Open Commands Window from this menu displays the agent's command window. This command window is one way to implement a visual command interface for an agent object. It displays one or more visual input commands by displaying the text caption provided by the client. The user can select one of these input commands by positioning the cursor over the caption and clicking on the mouse button. We sometimes refer to this form of visual input as cursor device input because the user can enter an input command using a cursor device such as a mouse or trackball.

The command event tells the client which input command the user has provided by specifying a command object. The command object provides access to a number of properties of the command object as set forth in the table below.

| Value | Description |
| --- | --- |
| User Input | Identifies the command object returned by the server. The following properties can be accessed from the common object. |
| Name | A string value identifying the name (ID) of the command. |
| Confidence | a long integer value indicating the confidence scoring for the command |
| Voice | A string value identifying the voice text for the command |
| Alt 1 Name | A string value identifying the name of the next (second) best command. |
| Alt 1 Confidence | A long integer value indicating the confidence scoring for the best command |
| Alt 1 Voice | A string value identifying the voice text for the next (second) best command match |
| Alt 2 Name | A string value identifying the name of third best command match. |
| Alt 2 Confidence | A long integer identifying the confidence scoring for the third match. |
| Alt 2 Voice | A string value identifying the voice text for the third best command. |
| Count | an integer value indicating the number of alternatives returned. |

Resume event—This event occurs when the animation resumes after being suspended. The end user can resume the animation by clicking on a suspend caption in the pop-up window associated with the agent.

Shutdown event—This occurs when the server shuts down.

StopListening—This event occurs when the server is no longer in the listening mode. This means that the character will not respond to speech commands.

The Character Object

The character object provides access to the properties of a character. These are not the same as the properties of the control. The user can change the properties of a character, but the values of these properties are read-only to client applications to avoid arbitrary changes to the user-specified settings. The properties of a character include:

Height—This property is an integer representing the height of a character in pixels.

Width—This is an integer representing the width of the character in pixels.

Left—This property is an integer that specifies the left edge of the current character frame. The Left property is expressed in pixels, relative to screen origin (upper left).

Top—This property is an integer that specifies the top edge of the current character frame. The Top property is expressed in pixels, relative to screen origin (upper left).

Even though the character appears in an irregularly shaped region window, the Height, Width, Left and Top properties of the character are based on the external dimensions of the rectangular animation frame used when it was created. Clients use the MoveTo method of the agent to change the character's position.

The character object includes the following properties relating to speech input and output: Listening, Pitch, Speed, and Volume.

Listening—This is a boolean value that indicates whether the agent is in listening mode.

Pitch, Speed, and Volume—These are read only integer values representing the pitch, speed, and volume of the speech output. In this implementation, the client is not allowed to alter these values directly. The client can, however, alter pitch, speed, and volume by embedding speech tags in the text string provided with a Speak method request. For example, the client can use a speed tag to alter the pitch and speed of speech output, and can use a volume tag to change the volume for a portion of the speech output.

The Input and Output Objects

The input and output object provide read only access to an agent's input properties and output properties.

The Commands Object

The commands object enables clients to specify a collection of commands that an agent object will respond to when a client becomes active. The server maintains a list of commands that are currently available to the user. This list includes commands that the server defines for general interaction, such as Stop Listening and Go Away; the list of available (but inactive) clients; and the commands defined by the current active client. The first two sets of commands are global commands; that is, they are available at any time, regardless of which client is active. Client-defined commands are available only when that client is active.

Each client application defines a collection of commands called the Commands object. To add a command to the Commands object, the client uses the Add or Insert methods of the commands object. For each command in the collection, the client can specify whether the user accesses the command through the Commands window, the application's (including Web page's) own interface controls, or both. For example, if the programmer wants a command to appear on the Commands window, she sets the command's Caption and Visible properties.

The client can also set the Voice property for a command, which enables its selection through speech recognition.

The client can add separator lines to your Commands object to group sets of commands in the Commands window. The client can also remove commands and separators.

Here's an example using VBScript, where Agent1 is the name (ID) for the agent control:

Agent1.Commands.Add "GetTime", "Current Time", "what's the current time"

Agent1.Commands.Add "GetDate", "Current Date", "what's the current date"

Agent1.Commands.Add "GetName", "Current Name", "what's your name"

In this example, the first line of code first disables the commands by setting the Enabled property to false. The following lines invoke the Add method to add commands to the commands window of the agent.

The server supports the following methods for the Commands object: Add, Insert, Remove, and RemoveAll.

The Add method adds a command to the Commands object. The client can also specify the caption, voice text, visual state, and enabled state for the command.

The Insert method inserts a command in the Commands object. The client specifies the command ID of the command to be inserted, a name of the command object to which the new command is related to, and value indicating whether the command should be inserted before or after the related command. The client can optionally specify a text string that will appear in the Commands window for the inserted command when the client is active.

For speech input, the client specifies the string value corresponding to the words or phrase to be used by the speech engine to recognize this command.

The Remove method removes a client command object (command or separator) from the Commands object. The client specifies a string value corresponding to the ID for the command or separator.

The RemoveAll method removes all client command objects (commands and separators) from the Commands object. Command objects that are removed from the collection do not display when the agent control is active.

The server supports the following properties for the Commands object: Caption, Count, Visible, and Voice.

The Caption property is a text string describing the text displayed for the Commands object in the Commands window.

The Count property returns an integer (read-only property) that specifies the count of commands in the Commands object.

The Visible property is a boolean value that determines whether the option of the Commands object is visible.

The Voice property is a text string corresponding to the words or phrase to be used by the speech engine for recognizing this command.

The string expression can include square bracket characters ([ ]) to indicate optional words and lists strings enclosed in parenthesis and separated by vertical bar characters (|) to indicate alternative strings. Alternates must be enclosed in parentheses. For example, "(hello [there] |hi)" tells the speech engine to accept "hello," "hello there," or "hi" for the command.

The client can also use an ellipsis ( . . . ) to support word spotting, that is, telling the speech engine to ignore words spoken in this position in the phrase, sometimes called garbage words. When ellipses are used, the speech engine recognizes only specific words in the string regardless of adjacent words or phrases. For example, if you set this property to ". . . check mail. . . " the speech recognition engine will match phrases like "Please check mail," or "Check mail, please" to this command. Ellipses can be used anywhere within a string.

The Command Object

A command is an item in a Commands collection. The server provides access to the commands specified by a client when the client is active.

For each command that the client specifies, it can define whether it will be accessible in the Commands window by using the Caption, Visible, and Enabled properties.

In addition, the client can set the words or phrases that it wishes the server to use to match speech input for a command.

When the server receives input for a command object, it sends a Command event, and passes back the name of the command as an attribute of the UserInput Object. The client can then use conditional statements to match and process the command.

Properties of the Command Object

Each command defined in a Commands object also has properties that affect the how the server presents the command. For example, if you supply content for the Voice property of a command, the supplied text is automatically compiled as part of the active vocabulary of the speech recognition engine, allowing speech recognition when the client activates its Commands object. Individual commands in a Commands collection also have a Visible property. When this property is set to True, the command will appear on the agent's pop-up Commands window. A client does not have to include any or all of your commands in the agent's Commands window, if it already provides its own interface for those commands. For example, a form may already display controls that enable user interaction. In this case, the client would not need to include access on the agent's Commands window, yet it can still provide speech access to those controls (by defining command objects for those fields).

The following Command properties are supported: Caption, Confidence, Enabled, Visible, and Voice.

The Caption property determines the text displayed for the command in the Commands window. The property is a string expression displayed as the caption for the command.

The Confidence property is the confidence threshold that the speech engine uses to match the command. The property is a numeric expression that evaluates to an integer that identifies confidence value for the command.

The Enabled property indicates whether the command is currently enabled. The property is represented as a boolean expression specifying whether the object is visible or bidden. If True, the command is enabled. If False, the command is disabled. If the Enabled property of the command's parent Commands object is set to False, the Enabled property of the command will also be automatically disabled. However, the Enabled property setting of the command is restored when the Enabled property of the parent Commands object is set to True.

The Visible property indicates whether the caption of the command is visible. The Voice property is string value corresponding to the words or phrase to be used by the speech engine for recognizing this command. A string expression can include square bracket characters ([ ]) to indicate optional words and lists of strings enclosed in parenthesis and separated by vertical bar characters (|) to indicate alternative strings. Alternates must be enclosed in parentheses. For example, "(hello [there] |hi)" tells the speech engine to accept "hello," "hello there," or "hi" for the command.

The Balloon Object

The word balloon object displays the "spoken" text of the agent. The server exposes the setting of the Enabled property as read-only. When Enabled property is set, the word balloon is automatically displayed and removed for "spoken" output. This property value is set by the user in one of the windows used to display the agent's properties. The client can define text in the balloon to appear differently than the spoken output by using the Map tag. For more information about this tag, see Speech Output Tags.

Speech Output Tags

The Agent services support modifying the speech output special tags inserted in the speech text string. This allows the client to add personality to the output expression of the character. Speech output tags use the following rules of syntax in this implementation:

1. All tags begin and end with a backslash character (\).
2. The backslash character is not allowed within a tag. To include a backslash character in tagged text, but outside of a tag, use a double backslash (\\).
3. Tags are case-insensitive. For example, \pit\ is the same as \PIT\.
4. Tags are white-space sensitive. For example, \Rst\ is not the same as \Rst\.

Unless otherwise specified, the speech output retains the characteristic set by the tag within the text specified in a single Speak method, unless modified by another tag. Speech output is automatically reset to the user-defined parameters after a Speak method is completed.

The following tags are supported:
Chr, Ctx, Emp, Map, Mrk, Pau, Pit, Rst, Spd, Vol Chr
Description
Sets the character of the voice.
Syntax
\Chr=string\

| Part | Description |
|---|---|
| string | a string specifying the character of the voice. If "Normal" (the default), the character speaks in a normal tone of voice. If "Monotone," the character speaks in a monotone voice. If "Whisper" the character whispers. |

Ctx
Description
Sets the context of the output text.
Syntax
\Ctx=string\

| Part | Description |
|---|---|
| string | A string specifying the context of the text that follows, which determines how symbols or abbreviations are spoken. If "Address," addresses and/or phone numbers are used. If "Email," electronic mail is used. If "Unknown," (default) the Context is unknown. |

Emp
Description
Emphasizes the next word spoken. This tag must immediately adjoin the word.
Syntax
\Emp\

Map
Description
Maps spoken text to text displayed in the word balloon.
Syntax
\Map-="SpokenText"="BalloonText"\

| Part | Description |
|---|---|
| SpokenText | A string specifying the text for spoken output. |
| BalloonText | A string specifying the text to appear in the word balloon. |

Remarks
This tag enables the programmer to use spoken text that is different than the text displayed in the word balloon Mrk
Description
Indicates a bookmark in the text. (See also the Bookmark event.) Number must be greater than zero
Syntax
\Mrk=number\

| Part | Description |
|---|---|
| number | The number of the bookmark. |

Remarks
When the server processes a bookmark, it generates a bookmark event.

Pau
Description
Pauses speech for the specified number of milliseconds.
Syntax
\Pau=number\

| Part | Description |
|---|---|
| number | The number of milliseconds to pause. |

Remarks
The speech engine supplied with the Animation Server supports values from 10 (0.01 sec) to 2550 (2.55 sec).

Pit
Description
Sets the baseline pitch of the output to the specified value in hertz.
Syntax
\Pit=number\

| Part | Description |
|---|---|
| number | The pitch in hertz. |

Remarks
The speech engine supplied with this implementation of the animation server supports values from 50 to 400.

Rst
Description
Resets all tags to the default settings.
Syntax
\Rst\

Spd
Description
Sets the baseline average talking speed of the speech output.
Syntax
\Spd=number\

| Part | Description |
|---|---|
| number | Baseline average talking speed, in words per minute. |

Remarks
The speech engine supplied with Microsoft Agent supports values from 50 to 250.

Vol
Description
Sets the baseline speaking volume of the speech output.
Syntax
\Vol=number\

| Part | Description |
|---|---|
| number | Baseline speaking volume; 0 is silence and 65535 is maximum. |

Having described an implementation of the animation server and its interface, we now describe how the server interacts with clients requesting animation services.

The first step that a client performs is to attach to the server. This is performed using a standard OLE mechanism which starts the server if it is not already running. The server maintains a list of all connected clients and terminates when either the last client detaches or it is explicitly shut down by the end user. This functionality is consistent with the COM specification.

Once the server is started, the client continues with the process of attaching by registering a notification interface with the server. The notification interface is used by the server whenever it needs to communicate either events or state changes with its connected clients. Notifications from the server to connected clients usually occur on a separate thread of execution in the server. This is necessary in order to prevent any single client from blocking the server while it is processing a notification.

Once a connection to the server is established, clients can request services from the agent server. These services consist of region window animations, lip synched animation, synthesized digital audio output, and input command processing. The animation services allow clients to trigger animation sequences in the agent. To accomplish this, the client calls the Play methods on the agent object's interface.

The server can also animate the agent object at any time but gives priority to the active client except in cases where it is deemed necessary to override the default behavior. The active state of a client can be set by either the end user (if the client allows it) or the client itself. Only one externally connected client is considered active at any time. The server also implements what are known as internal clients. These clients typically follow the same rules as external clients but can override the default behavior of the server if deemed necessary.

Whenever a client becomes input active it is sent a notification from the server in the form of an input Activate event. This activation is analogous to a window gaining the input focus in the Windows Operating System. Upon activation, the client receives input from the server. The active client will also be sent a notification (i.e. an input Deactivate event) from the server when it is about to become inactive (analogous to KillFocus).

Clients can explicitly make themselves input active however they should always be prepared to handle the case that another client has "stolen" the activation focus from them. This model works because it is ultimately the end user that is controlling which client has the chance to become active through either direct communication with the server or one of its connected clients.

If there are no requests, the server enters what is referred to as its idle state. When the server is idle, it causes the agent to play one of its idle animations picked at random. Before playing an idle animation, the server will first try to play a transitional animation to smoothly move the agent from its current position to a constant position known as the rest pose. All idle animations begin at the rest pose. Transitioning the agent through a constant position reduces the amount of jerkiness associated with quickly changing the state of the agent. This gives the agent a more natural feel. The server's idle animations will always be interrupted by an incoming client request.

If there are requests in the queue, the next request is popped off of the queue and the appropriate action is taken by the server. This process continues until the request queue is empty.

Because of the asynchronous nature of the agent's playback mechanism, it is important to implement a method that allows clients to notify themselves when a particular event has been triggered in the server. This is necessary for synchronizing events in the server with events in the client.

Consider the example where a client wants to play an animation that causes the agent to gesture at a particular location on the screen, display its own window, and then have the agent speak something to the user.

The server implements two mechanisms for allowing clients to synchronize their own actions with the servers. The first allows clients to add specific notification requests to the servers request queue. The server will process these notification requests with the same rules that it processes animation or audio requests. When the server encounters a notification request in the request queue, it simply sends the notification to the client that posted the request. This type of notification is acceptable for many synchronizing functions.

The other mechanism allows clients to embed notification requests in text that is to be synthesized into digital audio output. The bookmark tags, described above, are in implementation of this type of notification request. These notification requests offer a finer granularity than the previously described mechanism in that it allows clients to synchronize actions at the spoken word level.

Visual and Speech Input Command Notification

Above we described the methods and properties of the animation server that enable a client to specify input commands that an agent will respond to when the client is active. In the implementation of the server described above, these input commands include: 1) commands defined by the server and 2) commands defined by clients.

The server monitors for these client-specific commands as well as global commands and sends a notification to the appropriate client when it detects the input command. When the end user selects a command, via either the visual command interface or through a spoken command, the server sends a notification to the appropriate client that a command was selected. In this implementation, the server provides a notification in the form of a command event of the agent object.

The notification tells the client the name of the command that was selected along with other information from the speech recognition engine if the command was selected via a spoken command. One of the pieces of information that the server passes to the client though this interface is a confidence value for the command. This value represents how confident the speech recognition engine was that the command being passed to the client was actually spoken. Other information consists of possible alternatives to the spoken command and their confidences. Clients can use this information to determine whether the engine's confidence in the spoken command was sufficiently high enough for the client to actually proceed with the processing of the command, or if they should ask the user for verification of the command. It is more effective to allow clients to do this processing instead of the server because they have context information which may be useful in determining whether to accept a command or reject it.

The client server architecture described above enables software developers to create clients that take advantage of the animation and speech services of the server. Clients can request services from the server using a C/C++ COM Application Programming Interface (API) or via an ActiveX control interface. Developers, therefore, can create client application programmers written in C or C++, or written in Visual Basic from Microsoft Corp. For example, C or C++ programs can access the server functionality through the server's COM API. Using the Visual Basic Programming system, programmers can drag and drop an agent object's ActiveX control into a Visual Basic form.

The ActiveX control interface also enables developers to access the animation services in Web pages using scripting languages compatible with ActiveX controls like VBScript (Visual Basic Scripting Edition from Microsoft Corp.) or Java Script. The programmer can access the server from a web page by declaring the object on the page, providing a name for the object for easy reference.

To access the services of the animation server from a Web page, the programmer uses the HTML Object tag to declare the control in the Head or Body section of the page.

To use a method or property in VBScript (or Visual Basic®), the programmer uses the conventional syntax for methods, properties, and events. Examples of this syntax are set forth below:
agent.object.Method argument
agent.object.Property=value
agent.object_Event (argument as datatype)

Before describing how agent objects are created and accessed via Web scripts in more detail, we provide an overview of the browser software used to access web pages and process Web scripts.

Figure 11:
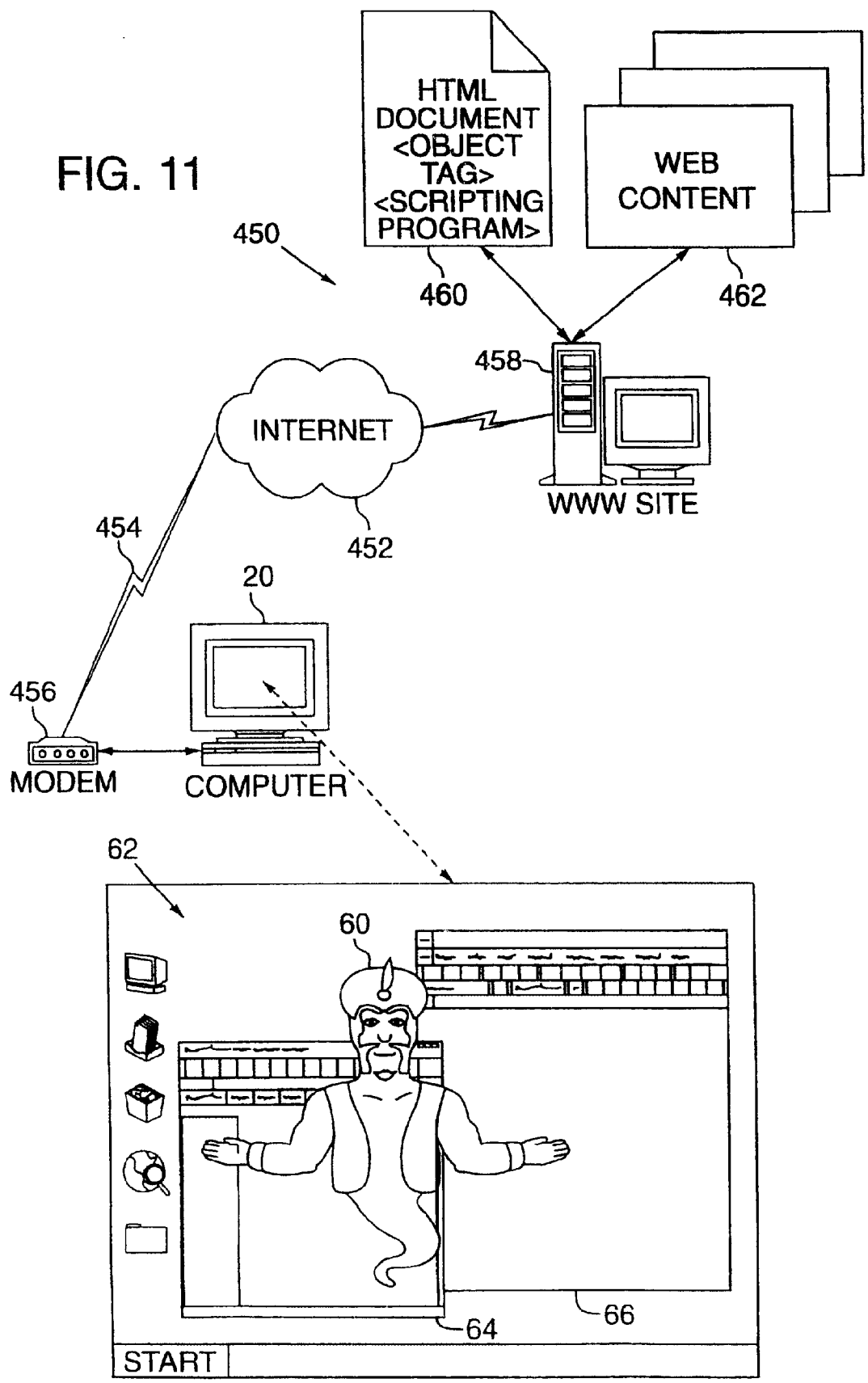
FIG. 11 is a diagram of a web browsing environment illustrating how interactive, animated user interface characters can be activated from Web pages.

FIG. 11 is a diagram illustrating a Web browsing environment 450 for accessing a Web page with an embedded agent object. In the Web browsing environment shown in FIG. 11, the computer 20 (also shown in FIG. 1) runs software, referred to herein as a "browser," for browsing of electronic documents and other data from local sources (e.g., the secondary storage 42 of FIG. 1) and from a remote computer network 452. The browser can be integrated with the operating system software, or can be a separate application software. The remote computer network 452 shown in FIG. 11 is the Internet.

The computer 20 connects to the Internet 452 over a telephone line 454 with a modem 456. Other physical connections to the computer network can be used, such as an ISDN, T1 or high speed telephone line and modem, a television cable and modem, a satellite link, an optical fiber link, an Ethernet or other local area network technology wire and adapter card, radio or optical transmission devices, etc. Although we specifically refer to the Internet here, this browsing environment also applies to other public or private computer networks, such as a computer network of a commercial on-line service or an internal corporate local area network (LAN), an intranet, or similar computer network.

Web pages and other files compatible for browsing via the browser software can reside as files of a file system stored in the computer's secondary storage 42 (FIG. 1), or reside as resources at a remote computer 458 (also referred to as a "site") connected to the computer network 452, such as a world-wide web site on the Internet. The example Web page 460 residing at the site 458 conforms with HTML standards and also includes an object tag and scripting program. The web page may also refer to additional information content 462, such as images, audio, video, executable programs, etc. (hereafter simply "Web content" 462), which also reside at the remote computer 458. The document 460 and Web content 462 are stored as files in a file system of the remote computer 458. The document 460 incorporates the Web content 462 using HTML tags that specify the location of files or other Internet resource containing the Web content on the Internet 452.

When used for browsing documents, the browser displays the document in a window the computer's user interface allocated to the browser by the operating system. FIG. 11 depicts the screen shot of FIG. 2 as an example of the image displayed on the computer's monitor. One of the windows 64 acts as the user interface of the browser.

When the browser renders the Web page, it identifies the HTML Object tag of the agent object embedded in the web page. In response, it creates an instance of the agent object and displays it on the user interface of the computer.

As explained in detail above, the agent's animation is not confined to the window of a host application, but rather, is displayed in region window having a bounding region that matches the bounding region of the animation. FIG. 11 shows how the genie character plays outside the window of the Internet browser's window.

The format of the HTML object tag is as follows:
<OBJECT classid=codebase=data=height=width=>

The classid parameter of this tag (if present) specifies a class identifier of the control. As the web browser renders the web page, it uses the class identifier to create the control, such as by calling the CoCreateInstance API function to cause the control's server application to be loaded and the server application's class factory to instantiate the control. The codebase parameter (if present) specifies a URL of a file containing the control (such as on the Internet). If the control is not installed on the end user's computer, the web browser can retrieve this file using the URL from the Internet and then install the file on the computer before instantiating the control using its class identifier. The data tag (if present) specifies persistent data for the control as either a text string or via a URL of a file containing the control's persistent data.

The specific format of an agent object is as follows:
<OBJECT
classid="clsid:855b244c-fc5b-11CF-91fe-00c04fd701a5"
id=Agent
>
</OBJECT>

Before displaying the web page, the web browser parses the HTML object embedding tags along with the other HTML format data in the hypertext documents. On encountering the HTML object embedding tag for an agent object during the parsing, the web browser instantiates the agent object using the class identifiers specified in the tags. To accomplish this, the web browser invokes a standard OLE interface function that looks in a registry to determine which control the tag refers to and loads it in-process.

If the control is not installed on the computer 20 (FIG. 1), the web browser can download it and the server using the URLs specified as the codebase attribute of the tags (if any). As it renders the HTML code in the web page, the web browser displays the content of the hypertext page in its window.

As the browser renders the Web page, it also encounters the script. For Visual Basic Script, the browser loads a Visual Basic Script runtime interpreter locally to translate the Visual Basic script on-the-fly and run the code. If the browser supports other scripting languages, it loads the appropriate interpreter based on the script language identified in the document. When the browser encounters script code, it loads an appropriate interpreter for the script language, and this interpreter then translates the code. The script code executes via calls from the interpreter in response to references to the character control interface, which in this specific implementation is the OLE control interface described in detail above. In the specific case of Visual Basic Script, for example, the browser loads an interpreter in the process space of the browser. To execute the script code, the browser uses the interpreter to translate the code and then accesses the OLE control interface in response to references to the control interface in the script code. As noted above, the browser loads the OLE control representing the character into the process space of the browser when it encounters an object identifier called the object tag. Thus, in this particular implementation, both the control and the interpreter are loaded in the process space of the browser. When the script code references the character control, the browser accesses the animation server, which runs in a separate process, through the control interface. The control acts a gateway, routing requests for access to the animation server's methods and properties for a particular character to the animation server.

In order to describe the interactive behavior of the agent, the script in the Web page references the agent object and uses the control methods, properties and events to define the input commands and output behavior of the object. For example, the script can include conditional statements that describe the behavior of the agent when the client specified input commands are detected.

Synchronization of Animations

The animation system supports interaction between and among animations through the use of synchronization services. These synchronization services enable an application to control interaction among separate animations that are being played on the display. While these services for synchronizing animations can be used on a variety of types of animation, they are particularly well suited for interactive animations such as the user interface characters (e.g., agent objects) described above. The user interface characters are arbitrary shaped (e.g., non-rectangular), do not occupy the entire display screen, and superimposed on the display such that they are not confined to the rectangular window of a hosting application. The hosting application is an application that controls the animation, i.e., the application that has made the animation request to make the character move or speak.

The synchronization services support at least the following functions:

1) synchronizing two or more animations on the display, and more specifically, synchronizing interactive animations such as the animated characters described above;
2) stopping an on-going animation in synch with another animation;
3) stopping an action of an on-going animation immediately; and
4) stopping an on-going animation in response to an event, including stopping an animation in response to detecting user input such as speech input or cursor device input.

The synchronization services are implemented in the client-server animation system described above. It is not required that the synchronization services be implemented in a client-server model. However, the client-server model described above is advantageous in that it allows several applications to access its animation and input/output services at the same time. This includes applications written in a scripting language (e.g., text files processed at run-time) or executable files compiled from conventional languages such as C, C++, or Java. Using the synchronization services, a single application can synchronize the interaction between two or more distinct characters. Different applications can control a single character, and can also concurrently control distinct animations.

Like the other animation services described above, the synchronization services of the animation server can be accessed by a variety of types of application programs, including, for example, applications written in C, C++, and Java, and rapid prototyping language such as Microsoft Visual Basic. Rapid prototyping languages, also referred to as "scripting languages," typically provide high level textual commands that run other procedures. For example, Visual Basic provides high level text commands that are used to run other programs called Visual Basic Controls. Programs written in these languages, called scripts, are usually in the form of a text file, which can be edited with a simple text editor.

The animation server provides access to the synchronization services through an Application Programming Interface (API) and high-level script commands. The API allows applications written in languages such as C, C++ and Java to invoke the synchronization services of the animation server. The high-level script commands enable text-based scripts to access the synchronization services via a script engine. The synchronization API may be implemented as part of the COM API of the animation server. The script commands access the animation server via an ActiveX control, called an agent control.

Before describing an implementation of the animation services, it is helpful to review the distinction between asynchronous and synchronous animation services. In order to provide asynchronous animation, the animation server should: 1) handle an animation request expeditiously, and in particular, within a predictable and predetermined time to avoid perceptible delay on the screen; and 2) update the position or state of each animation independently, without reference to an explicit external or internal clock relative to which the events of all simultaneously displayed animations are synchronized.

One way to implement asynchronous animation is to have the animation server spawn a separate thread from the code requesting the animation. By spawning a separate thread, the animation server enables the requesting code to continue executing without having to wait for the animation to complete. While it may be preferable to avoid scheduling the animation to run on the same thread as the requesting code, animations can be scheduled entirely within a single thread and still be considered asynchronous. This is particularly true for platforms that do not support multi-threading, such as in the case of the Windows 3.1 operating system. Animations can be scheduled within a single thread (or non-threaded process) with each animation limiting the time during which its animation services are in control of the flow of instructions in the thread.

In the current implementation, the specific synchronization services are provided via three primitives: "Wait", "Interrupt", and "Stop." These primitives are a special type of function call, which are accessible from a script or via the animation server API. The code that implements these functions is located in the animation server.

As described above, the animation server manages requests for animation services such as play and speak by maintaining a queue for each animation. The animation server queues animation requests in a first-in, first-out order. The code that implements the synchronization services utilizes the queues to synchronize the actions of animations that share the display at the same time. Below, we describe how the synchronization services synchronize the actions of animations on the display.

The behavior of each animation is defined in terms of actions. In the current implementation, the actions include playing a graphical animation (sequence of images depicting motion of a character), playing back audio output associated with a character such as the character's speech output or other sound effects, and lip-synched animation, which is a combination of speech output synchronized with mouth animation. Applications request actions by invoking the animation services of the animation server. For example, if an application invokes an animation service such as Play, GestureTo, or Speak, these animation requests correspond to actions of a character. These actions are "schedulable" in the sense that the animation server handles the scheduling of these actions for playback in response to animation requests from applications.

Synchronizing Two Asynchronous Animations

The synchronization services include a command called "wait" that enables an application to synchronize two asynchronous animations. In order to synchronize actions from different animations, an application identifies an action and the animation and invokes the wait function on that action. This causes the animation server to block playback of one animation until the specified action of the other animation is complete.

To implement this function, the animation server uses a data structure called a "request object." The request object is used to store an identification of the action of a particular character used to synchronize two different characters on the display.

To illustrate the operation of the wait function, consider the example introduced in the background section, which includes two interactive characters, the Genie and Merlin, performing a vaudeville routine. In our examples that follow, we use the syntax of the script language of the current implementation. These examples could also be implemented using the methods in the animation server's API.

In the example of Genie and Merlin, we would like to synchronize an action of Genie with an action of Merlin. Specifically, we would like both Genie and Merlin to dance and then hall Genie until Merlin completes his first dance routine. A script to generate the desired interaction would look like:
Genie.Play "GenieDance"
Set MerlinRequest=Merlin.Play ("MerlinDance")
Genie.Wait MerlinRequest
Merlin. Play "MerlinDanceMore"
Genie.Speak ("Hey, Merlin! Did you hear the one about the cat who ate the paper?")

In this example, it is assumed that Be "GenieDance", "MerlinDance" and "MerlinDanceMore" represent long animations. Note that in requesting an animation, the script identifies the character and the action in the form: Character.Action.

The assignment of "GenieWait" to the value of Merlin-.Play creates a "request object." When such a request object is passed with the Wait command, the animation queue that schedules Genie's animations is blocked until the specified action is completed. Any schedulable action can generate a request object. In the example above, both executions of animations and utterances are used to generate request objects.

Stopping an On-Going Animation In-Sync with Another Character

The synchronization services include another command named "Interrupt" to stop an ongoing animation in sync with the action of another animation. In order to stop an on-going animation of one character upon an action of another character, an application invokes the Interrupt function on the character that will interrupt another character. In making this interrupt request, the application also specifies the action of the other character that will be interrupted.

Like the Wait function, this function also uses the result object to identify the action used to synchronize the two characters. The request object is a parameter to the Interrupt command on character1 used to identify the action of character2 that will be interrupted.

The form of the function call is:
Character1.Interrupt RequestObject

To illustrate the operation of the Interrupt function, let us continue with the previous example. Since "MerlinDanceMore" is a long animation, it is almost certainly not finished when Genie finishes asking his question. That means that Merlin's on-going dance must be stopped. Thus, the Interrupt function can be used to halt the animation named Merlin as follows (in an extension of the scenario discussed above):
Genie.Play "GenieDance"
Set MerlinRequest1=Merlin.Play ("MerlinDance")
Genie.Wait MerlinRequest1
Set MerlinRequest2=Merlin.Play "MerlinDanceMore"
Genie.Speak ("Hey, Merlin! Did you hear the one about the cat who ate the paper?")
Genie. Interrupt MerlinRequest2

An interrupt call is similar to an animation request because it is placed on a character's queue and triggered when it reaches the top of the queue. It is queued up until all previously scheduled actions on the queue of the specified character (the interrupting character) are completed. At that point, though, it causes the action associated with the request object to be terminated, either by stopping an on-going action or by preventing a still-scheduled action from ever starting. When the animated character referred to as Genie finished asking the question ("Hey, Merlin. . . ") that item is removed from the character's queue. The next item on that queue is then examined. It is an "Interrupt" call, which instructs the animation server to immediately halt the on-going animation denoted by MerlinRequest2. Thus, the Genie character will appear to speak, and the Merlin character will appear to stop dancing, as if in response to the question the Genie character just asked. In the example, the character named Merlin will have reached the point that it is playing the MerlinRequest2 animation because the Genie character initially waited (via a Wait request) for the animation corresponding to the MerlinRequest1 object to complete before it started speaking. Interrupt calls provide a means by which characters can behave in a specified fashion until such time as another character has completed actions that are scheduled before the interrupt.

Stopping an On-Going Animation

The synchronization services include another command named "Stop" that enables an application to stop an animation that is being played or is already scheduled to be played. More specifically, this function is called on a character to stop an action of that character. In contrast to the Interrupt function, the stop function is not triggered upon an action of a character. Rather, the stop function is immediate in the sense that it stops the specified action in response to the stop request without waiting for some other specified action to occur.

The implementation of the stop function in the animation server stops a specified action of a character by deleting the specified action from the character's queue. To invoke the function, an application specifies the character and the action of that character to be stopped. Specifically, the application first creates a request object and then calls the stop function on a character, using the request object to specify the action to be stopped.

The form of this call is:
Character.Stop RequestObject
An example will illustrate how to access this function:
Set Interrupted=Genie.Speak "Why did the chicken cross the road?"
Genie.Stop Interrupted
Genie.Speak "Oh, you've heard that one before?"

It will appear that the telling of the joke will be stopped in mid-utterance, and Genie will interrupt himself, saying, "Oh, you've heard that one before?" In fact, the interruption happens so fast that the first statement never seems to happen at all. When the server receives the stop request for an action, it immediately stops the specified action.

When a script calls "Stop" on a character, the interruption is immediate. Interrupt, by way of contrast, is queued behind other actions, so that the interruption will only happen after the actions scheduled ahead of it have already been removed from the queue. A side effect of this difference is that a character object can only invoke Stop on its own actions, and can only invoke Interrupt to interrupt the action of some other character.

The animation server also provides a synchronization function called StopAll, which differs from Stop in that it stops all actions scheduled for a character.

Synchronizing User Input with Animation

As described above, the animation server has an event passing mechanism that can be used to notify an application when predefined events occur. These events are part of the animation server API and the control interface used for scripts. In the case of scripts, the animation server passes the events to the script engine, which is responsible for running the script.

The animation can send events back to the application (or script engine) to describe its progress as the application is executed. The events permit the application to synchronize animation with user input. This also applies to a script executing in the script engine. For instance, in the Visual Basic® script discussed above, the Click event could be used to enable the user to stop Genie by clicking the mouse button while positioning the cursor over Genie's animation on the screen:

Dim Req As Object
Dim Genie As Object
Private Sub Agent_Click(ByVal CharacterID As String,
ByVal Button As Integer,
ByVal Shift As Integer,
ByVal x As Integer,
ByVal y As Integer)
Genie.Stop Req
Genie.Speak "Oh, I guess you have heard that one before."
End Sub
Private Sub Form_Load( )
Agent.Characters.Load "Genie"
Set Genie=Agent.Characters("Genie")
Genie.Show
Genie.Speak "Click me if you've heard this one before!
"Set Req=Genie.Speak ("Why did the chicken cross the road?")
End Sub This example script uses a callback routine (Agent_Click) to stop the Genie's Speak action if the user clicks the mouse button on Genie in the display. The callback routine invokes the stop command and specifies the action to be stopped using the request object (Req). This request object is set to the action, Genie.Speak ("Why did the chicken cross the road?". Thus, if the user clicks on the Genie after it says, "Stop me if you've heard this one before!, then the animation server will remove the specified action from Genie's queue.

Accessing the Synchronization Services from Applications

Figure 12:
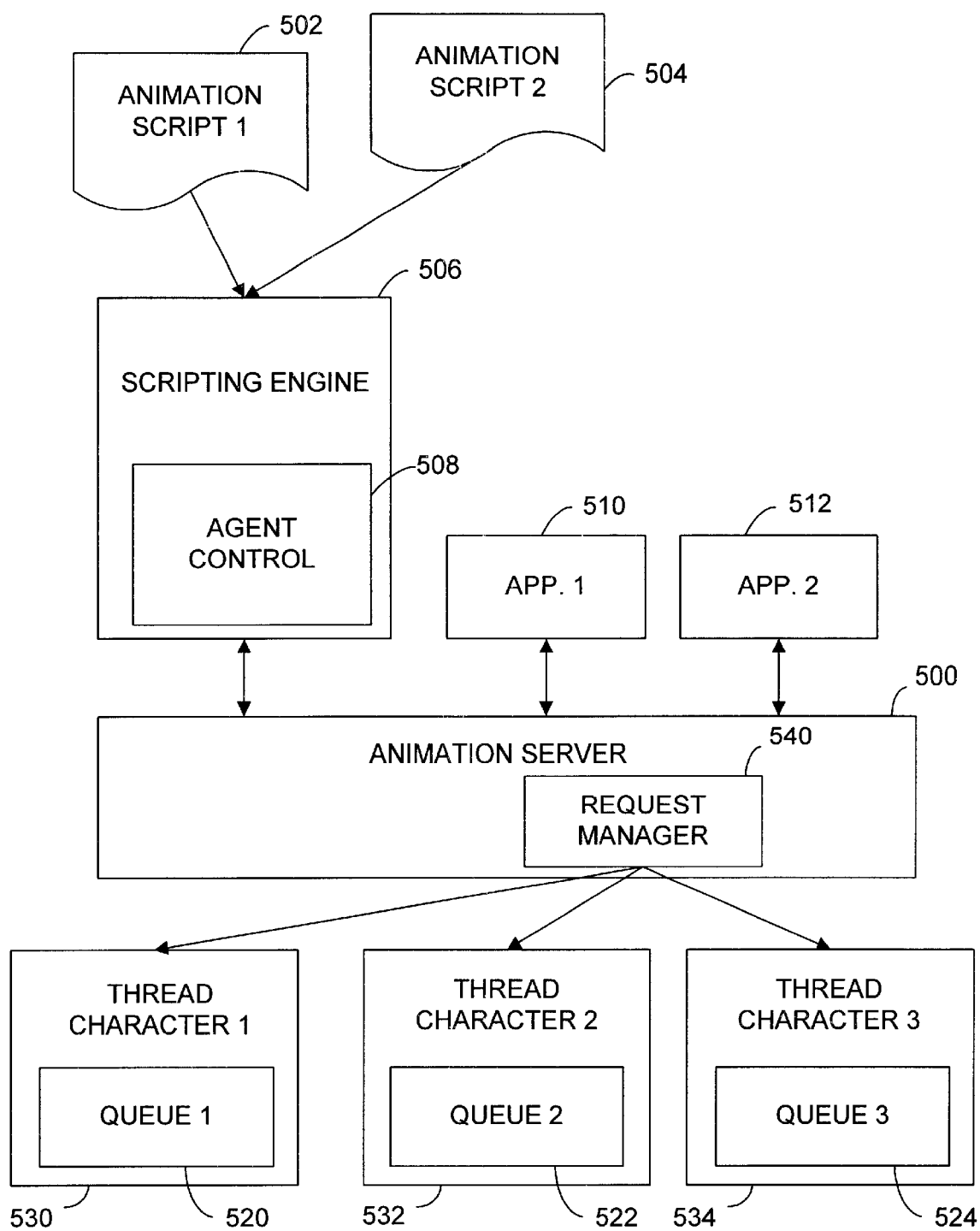
FIG. 12 is a block diagram illustrating the flow of information from scripts and other types of applications to the animation server and the character threads that it spawns.

FIG. 12 is a block diagram illustrating how applications access services, including the animation and synchronization services of the animation system. An animation server 500 implements the animation and synchronization services. Applications written in a prototyping language (scripts 502, 504) access the services via a scripting engine 506. These scripts are typically represented as text files, which are processed at run time by the scripting engine 506. Application programs written in conventional programming languages such as C, C++, and Java (e.g., APP. 1 and APP. 2 in FIG. 12) access the animation and synchronization services implemented in the server via the server's API.

Scripts 502, 504, written in Visual Basic or some other prototyping language, are interpreted in the scripting engine 506. The scripting engine 506 interprets the script commands, such as the animation and synchronization commands described above, and invokes the animation server to execute them. The type of scripting engine depends on the script language. Some examples of script engines include an instance of the Microsoft Visual Basic run-time environment, or a web browser like Microsoft Internet Explorer.

In the current implementation, the script engine 506 accesses the animation server through an OLE control called the agent control 508. The agent control 508 is a dynamic link library that can be loaded into the process space of programs that qualify as OLE containers. The script engine 506 is an OLE container and interacts with the OLE control 508 embedded in it via the standard OLE container-control interfaces. In turn, the agent control communicates with the animation server through the server's API.

In addition to accessing server functionality via a script engine, applications can also directly access the animation services via the server's API. FIG. 12 shows two additional applications accessing the server through its programming interface to illustrate that the server can process requests from several concurrently executing programs including the script engine 506, as well as other applications 510, 512.

The animation server 500 manages animation and synchronization requests using a queue (e.g., 520, 522, 524) for each character. The queue is used to queue all animation (Play, GestureTo), utterance (Speak), and interrupt (Interrupt) calls. These queues run asynchronously. In the current version for the Windows Operating System, the animation requests in each queue are carried out on separate threads of execution (530, 532, 534). The animation server includes a program module called the request manager 540 that is responsible for managing the queues for each character. The request manager is part of animation server application, and it runs on a separate thread from the threads for each queue.

The Request Manager

The request manager maintains a queue of pending requests for each character. When a client program (e.g., script or application program) makes an animation request to the animation server, the request manager appends a new entry to the tail of the queue of the character subject to the request. At any given time, the entry at the head of the queue, if any, is either the action (e.g., Play or Speak request) that is currently being executed or is a placeholder for an action stored in some other queue. Such placeholders serve as surrogates for "wait requests", operations through which one character "waits" until a specified action is performed and completed by some other character.

To clarify, an "action" refers to a scheduable animation requested by a client such as a Play or Speak request. The entries in the queues either represent scheduable actions or placeholders for the actions. The client identifies the action that is subject to a particular request via the request object. In response to an animation or synchronization request, the request manager takes the appropriate steps necessary to update the queues to process the request.

When an action completes, the request manager 540 removes that action from the appropriate queue, and, if necessary, marks any surrogate wait requests on other queues as "satisfied". It then activates the next item on the queue. When the request manager activates a surrogate wait request, it halts processing on the actions of that queue until the action specified in the wait request is satisfied. Similarly, when a surrogate for a wait request is satisfied and at the head of the queue, the request manager removes that action from the queue. A wait request may be satisfied before it reaches the head of the queue.

In the reference implementation, the wait request is not removed until it reaches the head of the queue. Alternative implementations could remove the wait request from the queue as soon as it is satisfied. Functionally, these alternative approaches are similar.

Stop and StopAll requests are processed similarly. Since they are executed immediately upon being made, they are not entered into the queue. When a stop request is encountered, the request manager immediately marks the relevant item as complete. Then, when that item reaches the head of the queue, it is removed immediately from the queue. As in the case of a satisfied wait request, an alternative implementation could remove an action that is subject to a Stop request immediately, rather than marking it complete.

Synchronization of Queues on Separate Threads

The essence of the current implementation of the scheduling threads is to make it very inexpensive to wait for the completion of an action such as a play or speak request. In the reference implementation shown in FIG. 12, this is accomplished by using several synchronization primitives, called "Events" in the Windows Operating System, and making a call to a synchronization function called "WaitForMultipleObjects" provided by the Windows Operating System.

In the Windows Operating System, a thread is a basic program unit that the scheduler in the operating system kernel uses to determine access to CPU time. A thread, in this context, is an execution path within a process, has its own private stack storage and execution context, shares memory allocated to its parent process, and can be one of many concurrent threads created by a single process. Any thread can create an "Event" object and obtain a handle to it using an operating system function called CreateEvent. Any threads belonging to any process can obtain a handle to the same event by specifying the event name. Any thread with a valid handle can then use the SetEvent to signal the occurrence of the event. Threads waiting for the event are then free to continue execution, and multiple threads may become eligible to run when the event is signaled.

When a program (thread or process) makes a call to any of the so-called "Wait functions" in the operating system (which include not only WaitForMultipleObjects, but also "WaitMessage", "WaitForSingleObject", "MsgWaitForMultipleObjects", and several others), the operating system kernel suspends the execution of the thread until a certain criterion is met. The operating system guarantees that the computation cost of a thread in this state is very low.

In the reference implementation, the animation server is an executable process that has multiple threads, including the request manager and any threads spawned for character queues (character threads). The request manager controls the execution of the character threads by setting any of four predefined events for the character queues: an Exit event, a Stop event, a New event, and a Done event. Each of the character queues has a unique set of these four events. The character threads are implemented as a loop that periodically calls the WaitForMultipleObject function in the operating system. When it makes this call, the thread specifies an array of handles to each of its four events in the order listed above. The order is important because it establishes the order in which the operating system determines whether each of these events has been signaled. After making the function call, a character thread waits for the four event objects to be signaled.

When the Exit event is set, the queue is to enter an exit state: all actions it contains should be removed and the character data cleaned up in preparation for shutdown of the animation server. When the Stop event is set, the currently active animation is being stopped, and should be cleaned up along with any other pending animation requests that were posted prior to the Stop. When the New event is set, a new animation request is being added to the queue. When the Done event is set, the current animation has just completed, and needs to be cleaned up.

To add an action or surrogate action to a queue, the request manager sets a New event for the character thread of the character identified in the request. When notified of this event by the operating system, the target character thread adds the action to the tail of its queue.

Each of the character threads execute concurrently under the multi-threading scheduling scheme of the operating system. As actions or surrogate actions reach the top of a queue, the character thread processes the action. In the case of standard Play or Speak request, the character thread makes a call to the request manager, which in turn, takes the appropriate action to play the animation. In the reference implementation, animations are played on the main thread of the application server. If multiple animations need to be drawn to the screen at the same time, the main thread makes drawing calls to the operating system quickly so that the animations appear simultaneously on the screen from the user's perspective. As noted below, it is also possible to implement the animations on separate threads of the animation server, but there are some performance trade-offs.

When a Wait request reaches the head of a queue, the character thread makes a call to the request manager indicating that it is in a wait state (blocked) pending the completion of a particular action. The blocked thread remains in this state until the request manager sets a Done event for this action. In response to this Done event, the character thread cleans up the surrogate action at the head of its queue and proceeds to the next action.

When an Interrupt request reaches the head of the queue, the character thread signals a stop event for the queue of the character that is subject to the interrupt request, identifying the action or actions to be stopped. The character thread for which the Stop event is set then responds to the Stop event by marking the identified action in its queue as complete.

Each of the character queues proceed to the next entry in their respective queues when they receive Done events. The character queues continue to pop entries from the top of their queues until signaled to stop or exit as described above.

The function, WaitForMultipleObjects, by its design, allows the queue to assign the appropriate priority to the event objects: Exit before Stop before New before Done. It also has the advantage that the operating system code supports the assurance that the state of the queue is actually kept internally consistent. By using operating system primitives for implementing the synchronization of the threads that control the animations, consistency is guaranteed.

While using synchronization primitives of the operating system has these advantages, it is also possible to implement the same synchronization features within the code of the animation server.

Implementing Animation Actions on Separate Threads

In the current reference implementation, Play and Speak requests are executed on the main thread of the application. This implementation has someadvantages and some disadvantages. Threads, although computationally fairly lightweight, carry fairly significant memory costs in some system implemention the Win32 API for the Windows Operating System. For instance, under Widows 95, approximately 64K of kernel memory is consumed by each thread just to maintain its essential data. Each character already costs one thread to support its request manager queue. Thus, a character's animation would cost yet another thread if animation requests were executed on a separate thread. The costs of the second threads would add up very quickly.

On the other hand, there are unfortunate interactions between some of the essential operations that must take place on the animation server application's main thread and the operations necessary to drive a character's animations. Under certain circumstances, for instance, the main thread of the server application can be "hung"—stop processing messages—by activities driven by inter-process communication between the animation server and a client. For example, the main server thread can be hung if it makes a call to an external thread or process that does not return. This, in turn, will hang the animation services, causing the characters to appear to freeze and to stop responding to user input. Depending on the environment in which the server is running, the costs of increased memory load, leading to a reduction of overall system responsiveness, need to be balanced against the costs of the possibility that a bug in a client program could cause all characters to freeze. Depending on the target machine configuration, one or another of these approaches might be better.

Complementing each character's queuing thread with a separate animation thread can be thought of as an extension of the reference implementation. The operations involving activating, scheduling, or interrupting animations are already implemented through the request manager, which is, therefore, necessarily thread-safe. Scheduling animations on a separate thread is straightforward, then—one creates a thread in which the frames or sounds of those animations can be executed, and handles the timing of those displays on that secondary thread.

Conclusion

Though we have described the synchronization methods with respect to specific implementations and operating system platforms, it is important to emphasize that the invention is not limited to these implementations. The animation system does not have to be implemented as an OLE server. The system can be implemented according to other object oriented programming models, or alternatively, need not be based on an object model at all. In the implementation described above, scripts access animation services via an OLE control. However, the use of an OLE control is only one possible way to process script commands in the script engine.

The specific syntax of the script commands and API calls used to access synchronization services can vary as well. For example, there are a variety of alternative ways to identify an action of an animation for the purpose of synchronizing the actions of different animations. The request object is just one possible data structure that can be used as an identification of a character's action. For example, the server's API may use a request object to identify an action, or may use a pointer to an action to identify the action.

As explained above, the animation server can be implemented as a multi-threaded application with the request manager and character queues executing on separate threads. A similar functionality can be achieved in multi-tasking platforms that do not support multi-threading. For example, each of the threads could be implemented as separate processes that employ shared memory to access shared data.

In view of the many possible implementations to which the principles of our invention may be applied, it should be recognized that the implementations described above are only examples of the invention and should not be taken as a limitation on the scope of the invention. Rather, the scope of the invention is defined by the following claims. We therefore claim as our invention all that comes within the scope and spirit of these claims.

We claim:

1. A method for synchronizing interaction between or among two or more animations on a display, wherein the animations comprise at least a first and a second animation, the second animation comprises at least one sequence of images, and the sequence of images is playable as an action for the second animation, the method comprising:

playing the first animation on the display;

playing the second animation on the display, which is separate from the first animation and is displayed concurrently with the first animation;

receiving a request from an application to synchronize an action of the first animation with the sequence of images playable as the action of the second animation, including receiving an identifier associated with the sequence of images playable as the action of the second animation;

blocking playback of the action of the first animation until it is determined playback of the sequence of images playable as the action of the second animation is completed; and responsive to determining playback of the action of the second animation is completed, unblocking playback of the action of the first animation.

2. The method of claim 1 wherein the request from the application to synchronize an action of the first animation with the sequence of images playable as the action of the second animation is a script command for blocking playback of the action of the first animation until it is determined playback of the action of the second animation is completed and the application is a script.

3. The method of claim 2 wherein the script comprises text based commands in a scripting language that request animation services and synchronization services, wherein the scripting language comprises a halt command specifying an action of the second animation, wherein the halt command halts the first animation until it is determined the specified action of the second animation has completed.

4. The method of claim 3 further including:

converting the request from a script command to a function call on an animation server; and in the animation server, processing the function call, including scheduling animation for playback.

5. The method of claim 4 wherein the animation server is capable of processing converted script commands from more than one script concurrently.

6. The method of claim 2 wherein the application specifies the identifier using a request object that represents an animation request from the application directed to the second animation.

7. The method of claim 1 wherein the first and second animations are interactive and respond to user input.

8. The method of claim 1 wherein the first and second animations comprise non-rectangular images that are superimposed on the display over a user interface of an executing application that is not controlling the first or second animations.

9. The method of claim 1 further including;
scheduling animation requests from the application for playback, where an animation request corresponds to an action of a specified animation and an action includes playing a sequence of images;
synchronizing animation requests by halting playback of a scheduled animation request.

10. The method of claim 9 wherein the action further includes audio output.

11. The method of claim 9 wherein the action further includes speech output generated from text.

12. The method of claim 9 wherein the action further includes lip-synched speech output, where speech output is synchronized with a sequence of images.

13. The method of claim 1 further comprising:
responsive to receiving the request from the application to synchronize an action of the first animation with the sequence of images associated with the identifier and playable as the action of the second animation, halting processing of actions for the first animation while permitting processing of actions for the second animation to continue; and
responsive to determining playback of the action of the second animation is completed, resuming processing of the first animation;
wherein blocking playback is as a result of halting processing of actions for the first animation.

14. The method of claim 1 wherein the action of the second animation is an animation sequence.

15. The method of claim 1 wherein the action of the second animation is specified in the request by an identifier identifying the action of the second animation.

16. The method of claim 15 wherein the identifier is a text name identifying the action of the second animation.

17. A computer-readable medium having instructions for performing a method for synchronizing interaction between or among two or more animations on a display, wherein the animations comprise at least a first and a second animation, the second animation comprises at least one sequence of images or sounds, and the sequence of images or sounds is playable as an action for the second animation, the method comprising:
playing the first animation on the display;
playing the second animation on the display, which is separate from the first animation and is displayed concurrently with the first animation;
receiving a request from an application to synchronize an action of the first animation with the sequence of images or sounds playable as the action of the second animation, including receiving the identifier for the sequence of images or sounds playable as the action of the second animation;
responsive to receiving the request from the application, blocking playback of the action of the first animation until it is determined playback of the sequence of images or sounds playable as the action of the second animation is completed; and
responsive to determining playback of the action of the second animation is completed, unblocking playback of the action of the first animation.

18. A method for supporting interaction between two or more animated user interface characters, the method comprising:
receiving requests from an application program to animate the user interface characters, where the requests correspond to schedulable actions including playback of a graphical animation sequence associated with a character;
scheduling the actions for playback;
in response to a request from the application program to synchronize playback of the first character and the second character, synchronizing playback of the scheduled actions by either halting playback of a scheduled action for one of the characters until it is determined a specified action for another character has completed or by terminating a scheduled action, wherein the specified action is specified via a reference to an animation sequence playable as the action.

19. The method of claim 18 wherein each character has a queue, and the step of scheduling actions corresponding to the animation requests comprises queuing the animation requests in the respective queues of the characters.

20. The method of claim 19 further including:
halting playback of scheduled actions in a first queue until it is determined an action specified in the synchronization request is played from a second queue.

21. The method of claim 19 including:
terminating a scheduled action in a first queue in response to the synchronization request.

22. The method of claim 19 including:
scheduling an interrupt in a first queue in response to the synchronization request;
processing requests from the first queue;
when the interrupt is processed, halting a specified action in another queue.

23. The method of claim 22 wherein the step of halting the specified action comprises deleting the specified action from the other queue.

24. The method of claim 18 wherein the application is a script and the synchronization and animation requests comprise script commands.

25. The method of claim 18 further including:
monitoring for an event specified by the application;
notifying the application when the specified event is detected;
receiving a synchronization request from the application that is initiated by the event;
in response to the synchronization request triggered by the event, halting playback of one of the characters.

26. An animation system on a computer readable medium, the animation system comprising:
animation services including an animation function for scheduling playback of an action in response to an animation request from an application that specifies the action; and
synchronization services including a first synchronization function for halting playback of a first animation until it is determined a specified action of another animation is played, wherein an action is specified to the synchronization function via a reference associated with a sequence of images playable as the action.

27. The animation system of claim 26 wherein the synchronization services further include a second synchronization command for halting playback of a specified action of the second animation after it is determined a scheduled action of the first animation is played.

28. The animation system of claim 26 including a script engine for processing a script and converting a script command to synchronize the first and second animations into a function call directed to the first synchronization function.

29. The animation system of claim 28 wherein the synchronization services are responsive to the script engine for synchronizing actions of two or more animations according to synchronization commands in an animation script.

30. An animation server on a computer readable medium, The animation server comprising:

animation request functions for scheduling playback of an action out of a set of actions in response to an animation request from an application that specifies the action, where the set of actions includes playback of distinct, arbitrary-shaped user interface characters and lip-synched speech output of the user interface characters;

input command functions for enabling the application to specify user input that the user interface characters will be responsive to, including speech input; and synchronization request functions including a first synchronization function for halting playback of a first user interface character until it is determined a specified action of another user interface character is played, the synchronization functions employing a queueing method for managing playback and synchronization of actions scheduled for the user interface characters such that the user interface characters can be played concurrently on a display screen.

31. An animation server for controlling a plurality of animated characters, the animation server comprising:

a plurality of queues, one queue for each of the animated characters, into which actions for a respective animated character are scheduled from play to animate the respective animated character, the plurality of queues comprising at least a first queue for a first animated character and a second queue for a second animated character, wherein the queues have heads;

a playing mechanism for playing actions scheduled for play in the plurality of queues; and a surrogate wait request schedulable into the first queue to block the playing mechanism from playing actions for the first animated character when the surrogate wait request reaches the head of the first queue, wherein the surrogate wait request is associated with ark action scheduled in the second queue, wherein the surrogate wait request is neutralized upon completion of the associated action.

32. The animation server of claim 31 wherein the surrogate wait request is neutralized upon completion of the referencing action by deletion.

33. The animation server of claim 31 wherein the surrogate wait request is neutralized upon completion of the referencing action by being marked as satisfied.

34. The animation server of claim 31 wherein actions are scheduled in the queues via a text scripting mechanism.

35. The animation server of claim 31 wherein the playing mechanism plays the actions as the actions reach the heads of the queues; and the surrogate wait request blocks the playing mechanism by halting processing of the first queue;

whereby actions scheduled after the surrogate wait request are prevented from being played until the associated action is completed.

36. A computer-implemented method of synchronizing, via a script, a first character animation processed by a first character thread with a second character animation processed by a second character thread, the method comprising:

specifying an animation sequence to be performed in the first animation via execution of a first script command in the script, wherein the first script command in the script stores a reference to the animation sequence for subsequent use in the script;

specifying a wait command comprising the reference to the animation sequence via execution of a second command in the script, wherein the wait command blocks execution of the second character thread processing the second character animation to suspend further action in the second character animation until it is determined the animation sequence referred to by the reference has completed;

determining the animation sequence referred to by the reference has completed; and responsive to determining the animation sequence referred to by the reference has completed, unblocking the second character thread processing the second animation to resume further action in the second character animation.

37. Animation server for controlling a plurality of animated characters, the animation saver comprising:

a playing mechanism for playing actions scheduled for play;

wherein the playing mechanism supports synchronization mechanisms comprising at least wait and interrupt synchronization directives;

wherein the wait directive blocks play of an animated character until a specified action for another character has completed; and the interrupt directive is specifiable in animation commands for a first animated character to schedule ending or preventing play of an action for another animated character upon completion of earlier-scheduled actions for tie first animated character.

38. The animation server of claim 37 wherein the synchronization mechanisms supported by the playing mechanism further comprise a stop directive;

wherein the stop directive is specifiable in animation commands for an animated character to immediately end or prevent play of an action for another animated character.

* * * * *

UNITED STATES PATENT AND TRADEMARK OFFICE
CERTIFICATE OF CORRECTION

PATENT NO.     : 6,369,821 B2
DATED          : April 9, 2002
INVENTOR(S)    : Merrill et al.

It is certified that error appears in the above-identified patent and that said Letters Patent is hereby corrected as shown below:

<u>Title page,</u>
Item [56], OTHER PUBLICATIONS, "/3maker.htm" should read -- /3dmaker.htm --.

<u>Column 6,</u>
Lines 17-18, "coordinating output" should read -- coordinating speech output --.

<u>Column 7,</u>
Line 8, "HPRGN" should read -- HRGN --.
Line 29, "WM_WINDQWPOSCHANGED" should read
-- WM_WINDOWPOSCHANGED --.

<u>Column 20,</u>
Line 57, "Idispatch" should read -- IDispatch --.

<u>Column 28,</u>
Line 23, "bidden" should read -- hidden --.

<u>Column 37,</u>
Line 48, "Be" should be deleted.

<u>Column 43,</u>
Line 2, "someadvantages" should read -- some advantages --.

<u>Column 45,</u>
Line 12, ";" should read -- : --.

<u>Column 46,</u>
Lines 33 and 36, "including" should read -- further including --.

<u>Column 47,</u>
Line 17, "The" should read -- the --.
Line 52, "ark" should read -- an --.

UNITED STATES PATENT AND TRADEMARK OFFICE
CERTIFICATE OF CORRECTION

PATENT NO. : 6,369,821 B2
DATED : April 9, 2002
INVENTOR(S) : Merrill et al.

It is certified that error appears in the above-identified patent and that said Letters Patent is hereby corrected as shown below:

<u>Column 48,</u>
Line 12, "script" should read -- set of executable commands --.
Lines 16 and 17, "first script command" should read -- first command --.
Line 17, "the script" should read -- the set --.
Line 18, "script stores" should read -- set stores --.
Line 19, "script" should read -- set of executable commands --.
Line 22, "script" should read -- set --.
Line 52, "tie" should read -- the --.

Signed and Sealed this

Fourth Day of November, 2003

JAMES E. ROGAN
*Director of the United States Patent and Trademark Office*